(12) United States Patent
Katagiri

(10) Patent No.: US 6,998,624 B2
(45) Date of Patent: Feb. 14, 2006

(54) APPARATUS AND METHOD FOR DETECTING RADIATION THAT USES A STIMULATE PHOSPHOR

(75) Inventor: Masaki Katagiri, Ibaraki-ken (JP)

(73) Assignee: Japan Atomic Energy Research Institute, Tokyo (JP)

( * ) Notice: Subject to any disclaimer, the term of this patent is extended or adjusted under 35 U.S.C. 154(b) by 57 days.

(21) Appl. No.: 10/727,979

(22) Filed: Dec. 5, 2003

(65) Prior Publication Data

US 2004/0135098 A1 Jul. 15, 2004

Related U.S. Application Data

(62) Division of application No. 10/238,069, filed on Sep. 10, 2002, now Pat. No. 6,825,479, which is a division of application No. 09/511,913, filed on Feb. 23, 2000, now Pat. No. 6,479,829.

(30) Foreign Application Priority Data

Feb. 26, 1999 (JP) .......... 11-050301
Mar. 3, 1999 (JP) .......... 11-055897

(51) Int. Cl.
G01T 1/105 (2006.01)
G01T 1/10 (2006.01)

(52) U.S. Cl. .......... 250/484.5; 250/484.4; 250/587

(58) Field of Classification Search .......... 250/484.5, 250/587, 483.1, 484.2, 484.4, 581
See application file for complete search history.

(56) References Cited

U.S. PATENT DOCUMENTS 3,971,941 A * 7/1976 Sewell et al. .......... 250/330
4,999,504 A 3/1991 Braunlich et al.
5,025,151 A 6/1991 Melcher
5,091,653 A 2/1992 Creager et al.
5,103,099 A 4/1992 Bourdinaud et al.
5,399,868 A 3/1995 Jones et al.
5,434,415 A 7/1995 Terada et al.
5,606,163 A 2/1997 Huston et al.
5,640,017 A 6/1997 Thevenin
5,912,825 A * 6/1999 Bingham .......... 708/300
5,962,857 A 10/1999 McKeever et al.
6,087,666 A 7/2000 Huston et al.
6,140,651 A 10/2000 Justus et al.
6,169,287 B1 * 1/2001 Warburton .......... 250/370.1
6,307,212 B1 10/2001 Huston et al.
6,417,518 B2 7/2002 Arakawa et al.

FOREIGN PATENT DOCUMENTS

JP 58-117476 7/1983
JP 58-117477 7/1983

OTHER PUBLICATIONS

D.J. Huntley et al., Nature, vol. 313, 10, pp. 105–107.
Kitaguchi et al., JAERI–Conf. 98–011, pp. 62–66 (Japanese language document).
S.W.S. McKeever et al., Radiation Protection Dosimetry, vol. 65, No. ¼, pp. 267–272.
Maekawa et al., Hoshasen, vol. 21, No. 3, pp. 69–78 (English Language abstract only).

* cited by examiner

Primary Examiner—Albert Gagliardi
(74) Attorney, Agent, or Firm—Banner & Witcoff, Ltd.

(57) ABSTRACT

Apparatus and method for radiation measurement suitable for use within and outside nuclear reactor or accelerator facilities when there is a need to perform real-time monitoring of radiation intensity over a wide dynamic range at many and broadly distributed sites of measurement. The apparatus and method are based on two principles: constant radiation monitoring and integrating measured radiation with a stimulable phosphor.

2 Claims, 38 Drawing Sheets

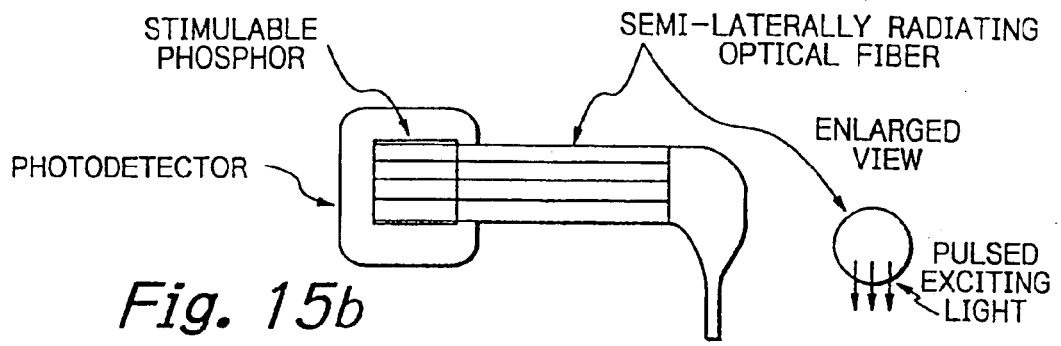
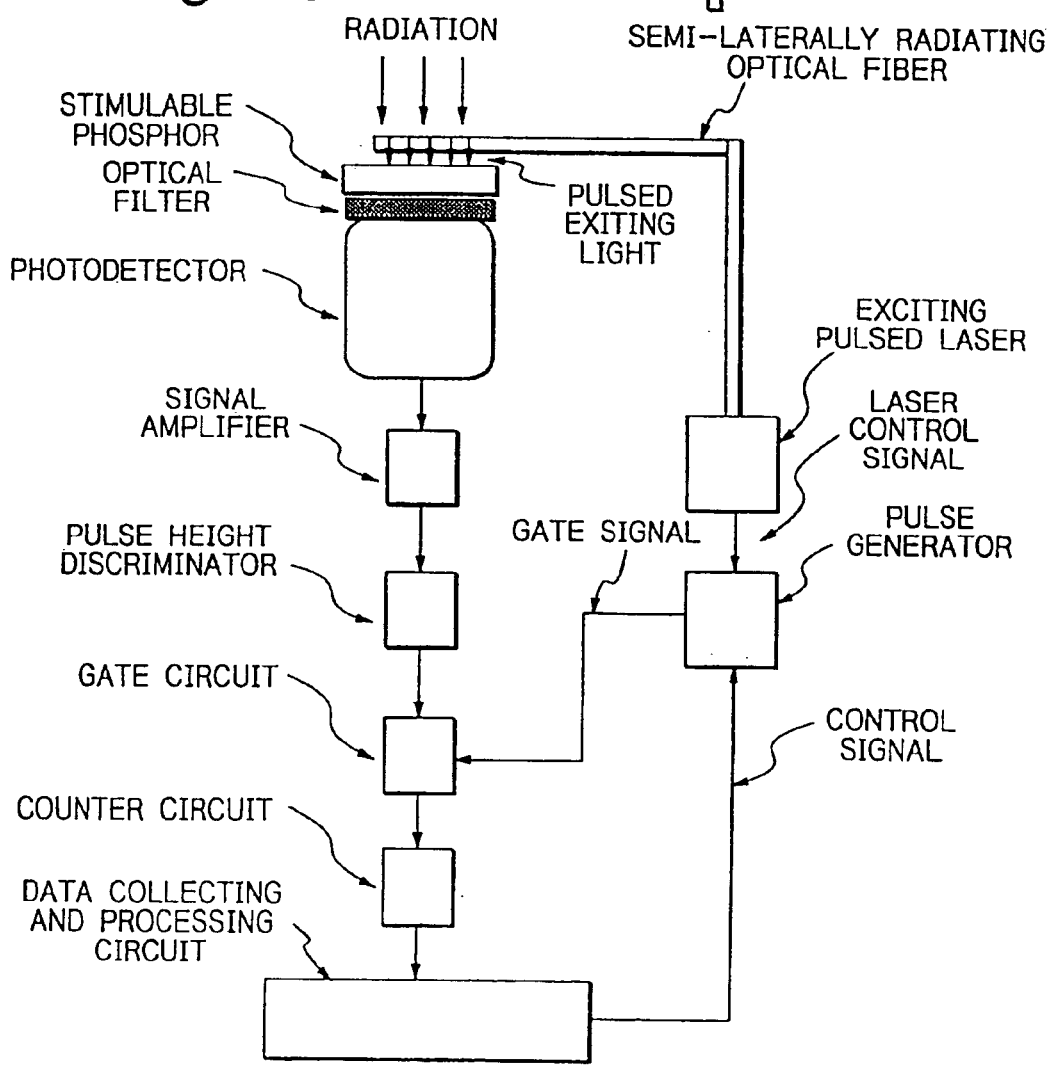

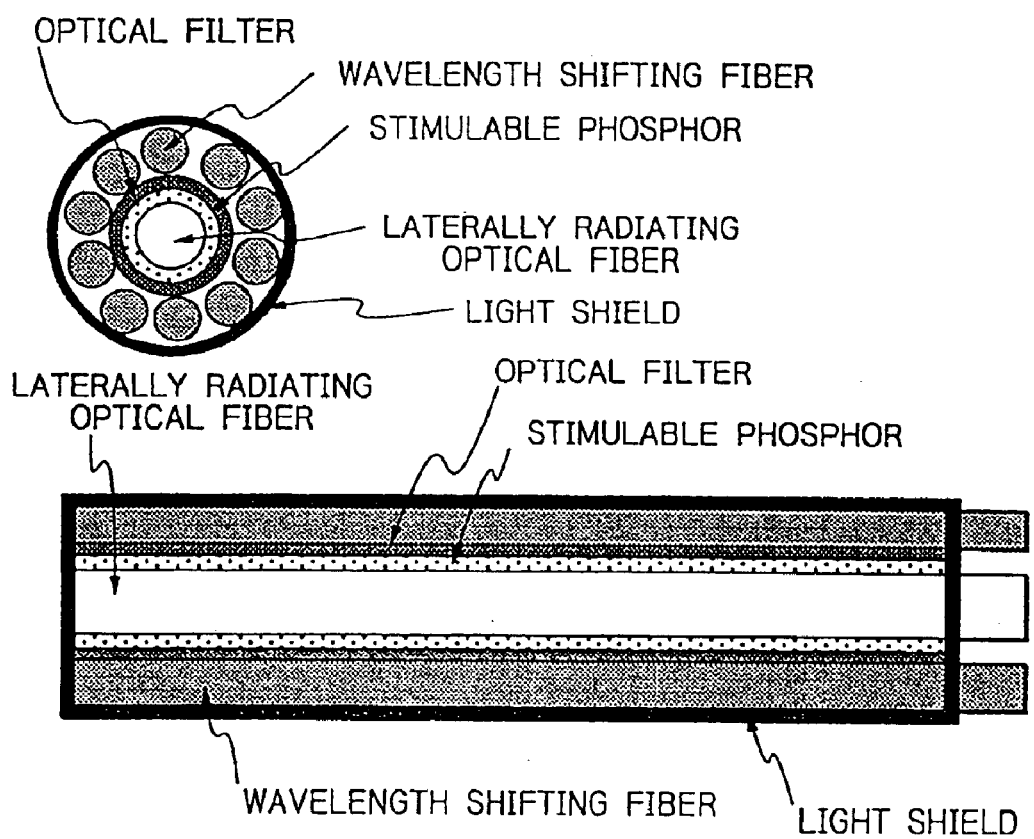

APPARATUS AND METHOD FOR DETECTING RADIATION THAT USES A STIMULATE PHOSPHOR

This application is a division of claims the benefit under 35 U.S.C. §§ 120 and 119(a) of prior filed U.S. application Ser. No. 10/238,069, filed Sep. 10, 2002 now U.S. Pat. No. 6,825,479, which is a divisional of Ser. No. 09/511,913 filed Feb. 23, 2000 now U.S. Pat. No. 6,479,829, which claims priority to Japanese Patent Application No. 50301/1999 filed in Japan on Feb. 26, 1999 and Japanese Patent Application No. 55897/1999 filed in Japan on Mar. 3, 1999.

BACKGROUND OF THE INVENTION

1. Field of the Invention

This invention relates to an apparatus and a method for radiation measurement that are suitable for use within and outside nuclear reactor or accelerator facilities when there is a need to perform real-time monitoring of radiation intensity over a wide dynamic range at many and broadly distributed sites of measurement. In nuclear reactor and accelerator facilities, one must use a detection system with which radiation doses ranging from a very weak level to a very intense level can be monitored at all times in various places. A portable radiation monitor is also required for personal radiation exposure management.

To meet these needs, the present inventors developed a simple differential and integral-type apparatus and method for radiation measurement that were based on the combination of two principles, one performing constant radiation monitoring and the other integrating measured radiations with a stimulable phosphor. The present inventors also developed an apparatus and method for radiation measurement that was applicable to a remote sensing radiation measuring apparatus, a radiation distribution measuring apparatus and a portable radiation measuring apparatus.

2. Prior Arts

Conventionally, radiation measurement has been performed with an ionization chamber, a Geiger-Mueller counter (GM counter) and a scintillation detector consisting of a scintillator combined with a photomultiplier tube whereas neutron dosimetry has been conducted with a $BF_3$ or $^3He$ counter. However, measuring a wide dynamic range of radiation doses from a very weak level to a very intense level by a single detector is extremely difficult and to overcome this difficulty, an ionization chamber of low sensitivity has been used in combination with a scintillation detector of high sensitivity. High-intensity radiation doses that occur instantaneously around an accelerator or a target or which result from an unexpected accident in nuclear reactor facilities have also been difficult to measure since they saturate most detectors.

A stimulable phosphor has two actions, one is accumulating an incident radiation and outputting the quantity of accumulated radiation as stimulated fluorescence upon stimulation by exciting light and the other is emitting prompt fluorescence upon excitation by an incident radiation. On the basis of these two actions, a method was developed that could measure the quantity of incident radiation by selectively detecting stimulated fluorescence and prompt fluorescence at specified time intervals [Japanese Patent Application No. 50301/1999]. By using an apparatus for radiation measurement that relies upon this technique of time-division multiplexing, a wide dynamic range of radiation doses from a very low level to a very high level can be covered with a single detector and, at the same time, instantaneous high-intensity radiation and neutron doses can be measured.

One of the important constituents of the present invention is a stimulable phosphor used as a radiation detection medium. FIG. 35 is a schematic of the apparatus descried in D. J. Huntley et al., Nature, Vol. 313, 10, pp. 105–107 for reading the quantity of radiation accumulated in the stimulable phosphor. A stimulable phosphor sheet illuminated with a radiation in a different place is set on a reading table and then illuminated from the front with exciting light issued from an argon laser; the resulting emission of stimulated fluorescence is passed through bandpass optical filters centered at the frequency of stimulated fluorescence and subsequently detected with a photomultiplier tube; in accordance with its intensity, the detected fluorescence is digitized by a signal processor to determine the quantity of incident radiation.

In another conventional method, a small amount of stimulable phosphor is attached to the end of an optical fiber and illuminated with exciting light launched into the optical fiber and photons in the stimulated fluorescence that emits during the irradiation are counted to determine the incident radiation dose. This method was described by Kitaguchi et al. in JAERI-Conf 98-011, pp. 62–66 and the apparatus for implementing it is illustrated in FIG. 36. Due to the small amount of the stimulable phosphor used, it is difficult to increase the sensitivity of this method.

According to Radiation Protection Dosimetry, Vol. 65, No. 1/4, pp. 267–272, S. W. S. Mckeever et al. proposed a method in which a stimulable phosphor was illuminated with exciting light from a pulsed light source to read the dose of accumulated radiation. A schematic of this pulsed OSL (optically stimulated luminescence) system is shown in FIG. 37. After applying an impulse of exciting light on the timing shown in FIG. 38, the stimulated luminescence emitted in accordance with the life of fluorescence is amplified with a high-speed amplifier and photons in it are counted with a fast counter circuit to determine the accumulated dose of radiation. This method requires a high-speed measurement system including a photodetector.

A conventional method that can measure the dose of radiation and the position of measurement simultaneously with a simple apparatus was described by Maekawa et al. in Hoshasen, Vol. 21, No. 3, pp. 69–78. In this method, the detecting portion shown in FIGS. 39 and 40 is installed at each site of measurement and a plurality of such detecting portions are connected in series by an optical fiber for radiation measurement. Scintillator is used as a radiation detecting medium and the fluorescence emitted is detected with a wavelength shifting optical fiber and the radiation intensity as well as the position of measurement are determined from the difference between the arrival times of fluorescence at opposite ends of the wavelength Shifting optical fiber. A problem with this method is that if a radiation of high intensity is incident, not only its intensity but also the position of measurement is difficult to determine.

SUMMARY OF THE INVENTION

An object, therefore, of the present invention is to provide an apparatus and a method for radiation measurement which allow a wide dynamic range of radiation doses from a very weak level to a very intense level to be covered with a single detector and which enable simple, sensitive and correct dosimetry of high-intensity radiations and neutrons that occur instantaneously around an accelerator or a target or which result from an unexpected accident in nuclear reactor facilities.

Another object of the invention is to provide a compact and simple apparatus for radiation measurement that can be used in routine operations of nuclear reactor and accelerator facilities, as well as a method for use on the apparatus.

Yet another object of the invention is to provide an apparatus and a method that enable simple and sensitive measurement of radiation doses at many and broadly distributed sites of measurement.

A further object of the invention is to provide an apparatus for radiation measurement with which a two-dimensional radiation image can be easily obtained.

BRIEF DESCRIPTION OF THE DRAWINGS

FIG. 15 shows an apparatus for implementing still another embodiment of the method of radiation measurement of the invention which uses a stimulable phosphor to be illuminated with exciting light through semi-laterally radiating optical fibers;

FIG. 22 shows a radiation detecting portion for use in yet another embodiment of the apparatus of the invention which is a cylindrical arrangement of a laterally radiating optical fiber, a stimulable phosphor, an optical filter and wavelength shifting optical fibers;

DETAILED DESCRIPTION OF THE INVENTION

Figure 1:
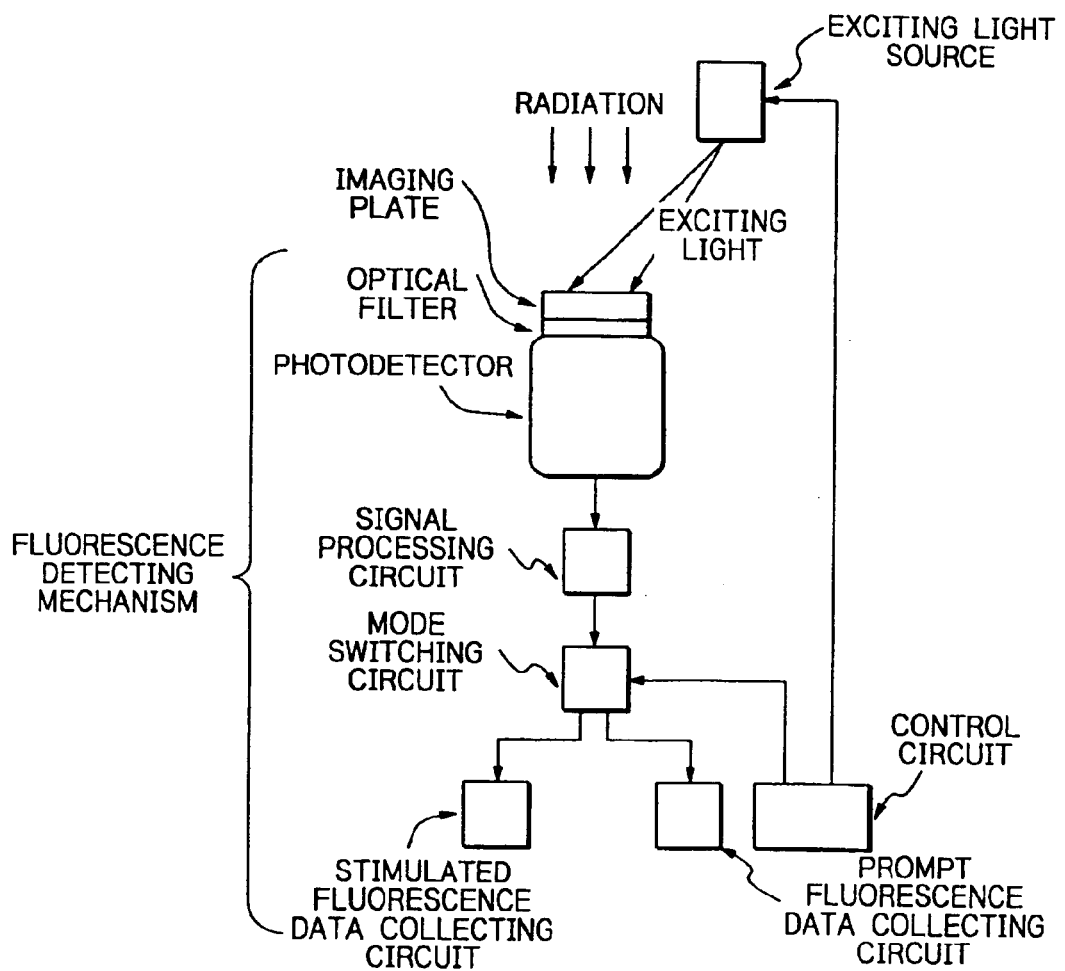
FIG. 1 shows an apparatus for implementing an embodiment of the method of radiation measurement of the invention which relies upon time-division multiplexing of stimulated fluorescence and prompt fluorescence that are emitted from a stimulable phosphor.

While making efforts to develop an apparatus for radiation measurement in which a wide dynamic range of radiation doses from a very low level to a very high level can be covered with a single detector and which can also measure high-intensity radiation and neutron doses, the present inventors noted two actions of a stimulable phosphor, one being the ability to accumulate an incident radiation and output the quantity of accumulated radiation as stimulated fluorescence upon stimulation by exciting light and the other being the ability to emit prompt fluorescence upon excitation by an incident radiation, and developed a method that could measure the quantity of incident radiation by selectively detecting stimulated fluorescence and prompt fluorescence at specified time intervals [Japanese Patent Application No. 50301/1999, supra]. By employing this method, the required radiation detecting performance can be easily ensured by a simple apparatus. Another purpose of the invention is to provide an apparatus for radiation measurement in which if a fluorescence detecting mechanism is saturated to failure by the incidence of an intense radiation within a short period of time, stimulated fluorescence is read after the recovery of the fluorescence detecting mechanism so as to measure the incident dose of intense radiation. To this end, the fluorescence detecting mechanism is monitored for saturation on a time-division multiplexing basis and the dose of radiation accumulated in a stimulable phosphor is measured with the quantity of exciting light or the sensitivity for fluorescence detection being altered in such a way as to ensure that the fluorescence detecting mechanism is not saturated to failure when reading the rapid intense dose of incident radiation after recovery from the saturated state.

To read the dose of radiation accumulated in a stimulable phosphor, it is illuminated with short durations of pulsed exciting light and signal processing is performed with a conventional radiation detecting system by taking advantage of the short lifetime of the stimulable phosphor. This method offers the advantage that the accumulated dose of radiation can be conveniently measured by easily switching between stimulated fluorescence and prompt fluorescence on a time-division multiplexing basis.

If a laterally radiating optical fiber is used to illuminate the stimulable phosphor with exciting light, convenient and remote-controlled excitation can be performed for reading the dose of radiation accumulated in the stimulable phosphor. This eliminates the need to install an exciting light source such as a laser in intensely irradiated areas and, what is more, the mechanism for illuminating exciting light can be constructed in a compact size. The use of a laterally radiating optical fiber has the added advantage of providing ease in measuring a two-dimensional radiation image using a stimulable phosphor sheet.

To ensure a large area for detecting both stimulated fluorescence and prompt fluorescence, wavelength shifting optical fibers sensitive to the wavelength of fluorescence may be arranged side by side and this eliminates the need to install a photodetector such as a photomultiplier tube in intensely irradiated areas. If desired, a ribbon array of wavelength shifting optical fibers may be used in combination with a parallel arrangement of laterally radiating optical fibers. The laterally radiating optical fibers may also be sandwiched between assemblies each consisting of a stimulable phosphor, an optical filter and a ribbon array of wavelength shifting optical fibers. These designs allow for constructing small and various shapes of radiation detecting portion.

Alternatively, the detecting portion of the sandwich structure may be extended over a distance and exciting light having very short pulse widths is launched into laterally radiating optical fibers so that a stimulable phosphor is illuminated with the propagating short-pulsed exciting light to emit stimulated fluorescence which is then detected with wavelength shifting optical fibers. This method enables measurement of a long-distance distribution of radiation dose. If this method and detection of prompt fluorescence are selectively used, the distribution of radiation dose can be measured in many and broadly distributed areas.

If desired, the stimulable phosphor used as a radiation detecting medium in the methods described above may incorporate at least one neutron converter selected from among Gd, $^6$Li and $^{10}$B as materials that convert neutrons to an ionizable radiation. Alternatively, the stimulable phosphor may be mixed or combined with such neutron detecting medium. In either way, one can provide an apparatus and a method for radiation measurement that are capable of neutron detection.

EXAMPLES

Example 1 is described below with reference to FIG. 1. As already mentioned, a stimulable phosphor which is used as a radiation detecting medium in the invention has two actions, one is accumulating an incident radiation and outputting the quantity of accumulated radiation as "stimulated fluorescence" upon stimulation by exciting light and the other is emitting "prompt fluorescence" upon excitation by an incident radiation. The basic concept of the invention is to provide a method of measuring the quantity of incident radiation by selectively detecting stimulated fluorescence and prompt fluorescence real-time at specified time intervals using a fluorescence detecting mechanism.

In the example under consideration, a sheet of radiation detecting medium can be used, as exemplified by X-ray imaging plates of BAS Series commercially available from Fuji Photo Film Co., Ltd. The rear faces of the commercial X-ray imaging plates are not transparent but can be easily modified to become transparent. The stimulable phosphor used in these imaging plates is BaFBr:Eu$^{2+}$ and can be excited in a wavelength band of 490 nm–680 nm (where more than half of the maximum efficiency is exhibited). Upon illumination with exciting light, BaFBr:Eu$^{2+}$ emits stimulated fluorescence at a wavelength of 390 nm and the life of emitted fluorescence is 0.8 μs.

While the example under consideration assumes the use of BaFBr:Eu$^{2+}$, other stimulable phosphors such as KCl:Eu$^{2+}$, RbBr:Tl, SrS:Eu and Sm may be used and imaging plates containing these as detection mediums can be used as specimen by altering the wavelength of exciting light and the wavelength of stimulated fluorescence to be read.

A laser is used as the light source of exciting light. The required laser power depends on the reading speed and the reading area of the imaging plate in the form of a stimulable phosphor sheet. If the detection area is a circle with a diameter of 5 mm, a power of at least several milliwatts is required. Since BaFBr:Eu$^{2+}$ in the imaging plates of BAS Series (Fuji Photo Film Co., Ltd.) can be excited in a wavelength band of 490 nm–680 nm, a laser operating in this wavelength band to produce high power with ease is either a semiconductor laser (635 nm) or a green-light laser (532 nm).

An optical bandpass filter centered at the wavelength of stimulated fluorescence is provided at the back of the imaging plate and the stimulated fluorescence emitted from the rear face of the imaging plate is passed through the filter to reject the unwanted scattering component of the exciting light. In the example under consideration, the stimulated fluorescence has a wavelength of 390 nm, so the optical filter should have a central wavelength of 390 nm.

We now describe the fluorescence detecting mechanism. The photodetector that can be used in the invention is a photomultiplier tube having high sensitivity around 390 nm which is the wavelength of stimulated fluorescence. The optical signal detected by the photomultiplier tube is fed into a signal processing circuit where it is amplified and subjected to other signal processing. In the example under consideration, the optical signal is processed by photon counting. Specifically, the optical signal is subjected to the shaping of pulse waveform, discriminated from noise in a pulse height discriminator and picked up as a pulse signal. Alternatively, the reading method conventionally applied to imaging plates may be employed such that a train of stimulated fluorescence signals are integrated in an integrating circuit to read the accumulated dose of radiation.

The output pulse signal from the signal processing circuit is inputted to a mode switching circuit which, in response to a mode switching signal from a control circuit, supplies the pulse signal to either a stimulated fluorescence data collecting circuit if the operation is in a stimulated fluorescence mode, or a prompt fluorescence data collecting circuit if the operation is in a prompt fluorescence mode. In the example under consideration, the two data collecting circuits are each composed of a counting circuit.

Figure 2:
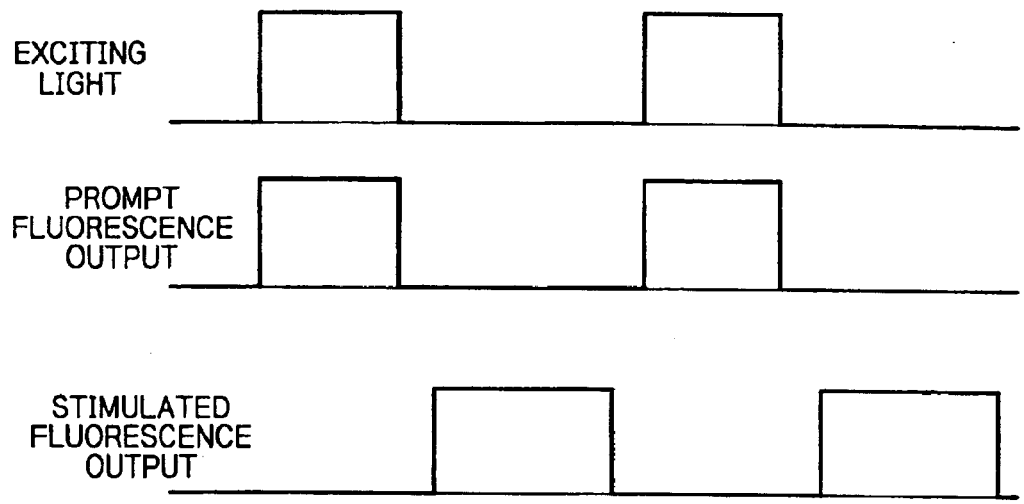
FIG. 2 is a timing chart for time-division multiplexing that is performed by switching between a stimulated fluorescence mode and a prompt fluorescence mode.

Switching between the stimulated and the prompt fluorescence mode is performed by the control circuit on the timing shown in FIG. 2. While the imaging plate in the form of a stimulable phosphor sheet is illuminated with exciting light, stimulated fluorescence is read but, otherwise, prompt fluorescence is read. Hence, by controlling the exciting light source to emit exciting light synchronously with the reading cycles, both stimulated fluorescence and prompt fluorescence can be detected with a single fluorescence detecting mechanism at specified time intervals.

Figure 3:
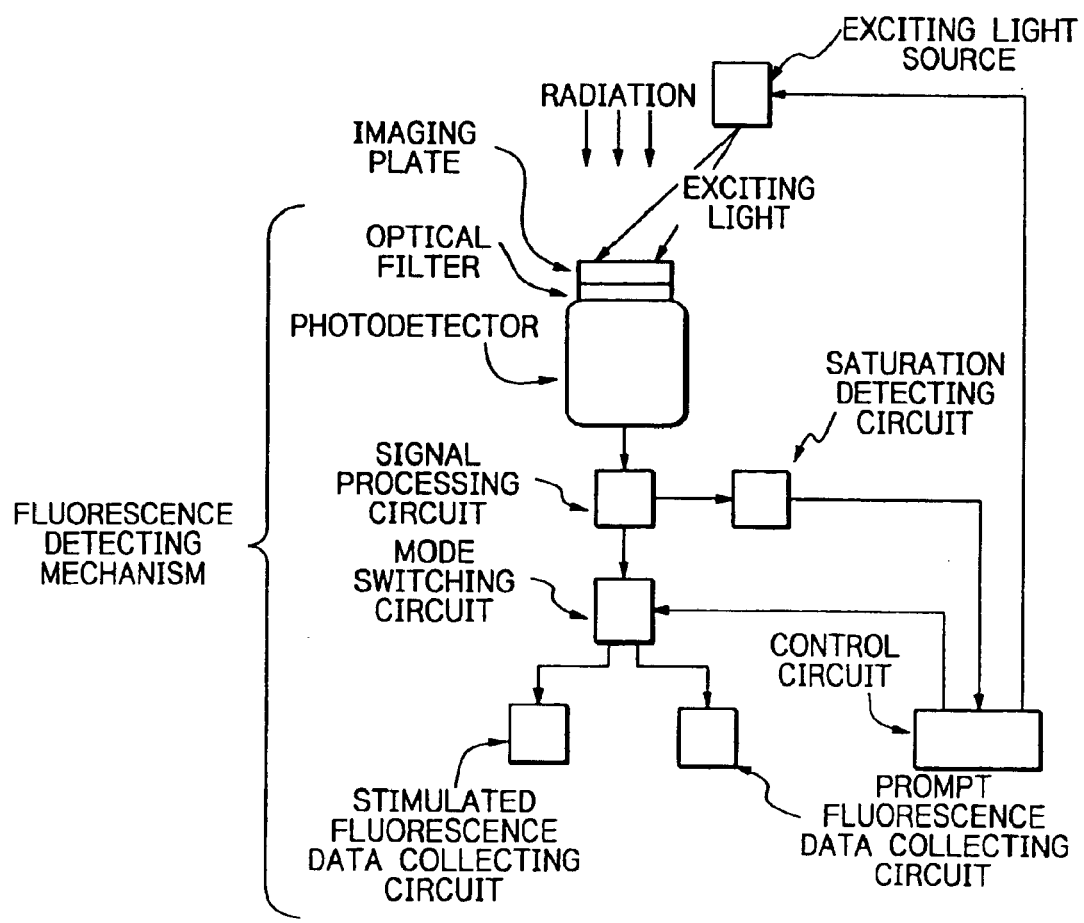
FIG. 3 shows an apparatus for implementing another embodiment of the method of radiation measurement of the invention which is capable of detecting high-intensity radiation with a stimulable phosphor.

We now describe example 2 with reference to FIG. 3. When stimulated fluorescence and prompt fluorescence are being detected from the imaging plate by the fluorescence detecting mechanism at specified time intervals during radiation measurement in or around an accelerator, an intense radiation may be incident within a short time to saturate the fluorescence detecting mechanism which is no longer operational. If this occurs, no signal enters the signal processing circuit. Hence, monitoring is performed with a saturation detecting circuit which, when the fluorescence detecting mechanism is saturated, sends a saturation signal to the control circuit. When the incidence of the rapid and intense radiation has ended and the fluorescence detecting mechanism has recovered from saturation, the operation is switched to the stimulated fluorescence mode by the mode switching circuit and the stimulated fluorescence is detected, thereby measuring the rapid and intense dose of the incident radiation.

Figure 4:
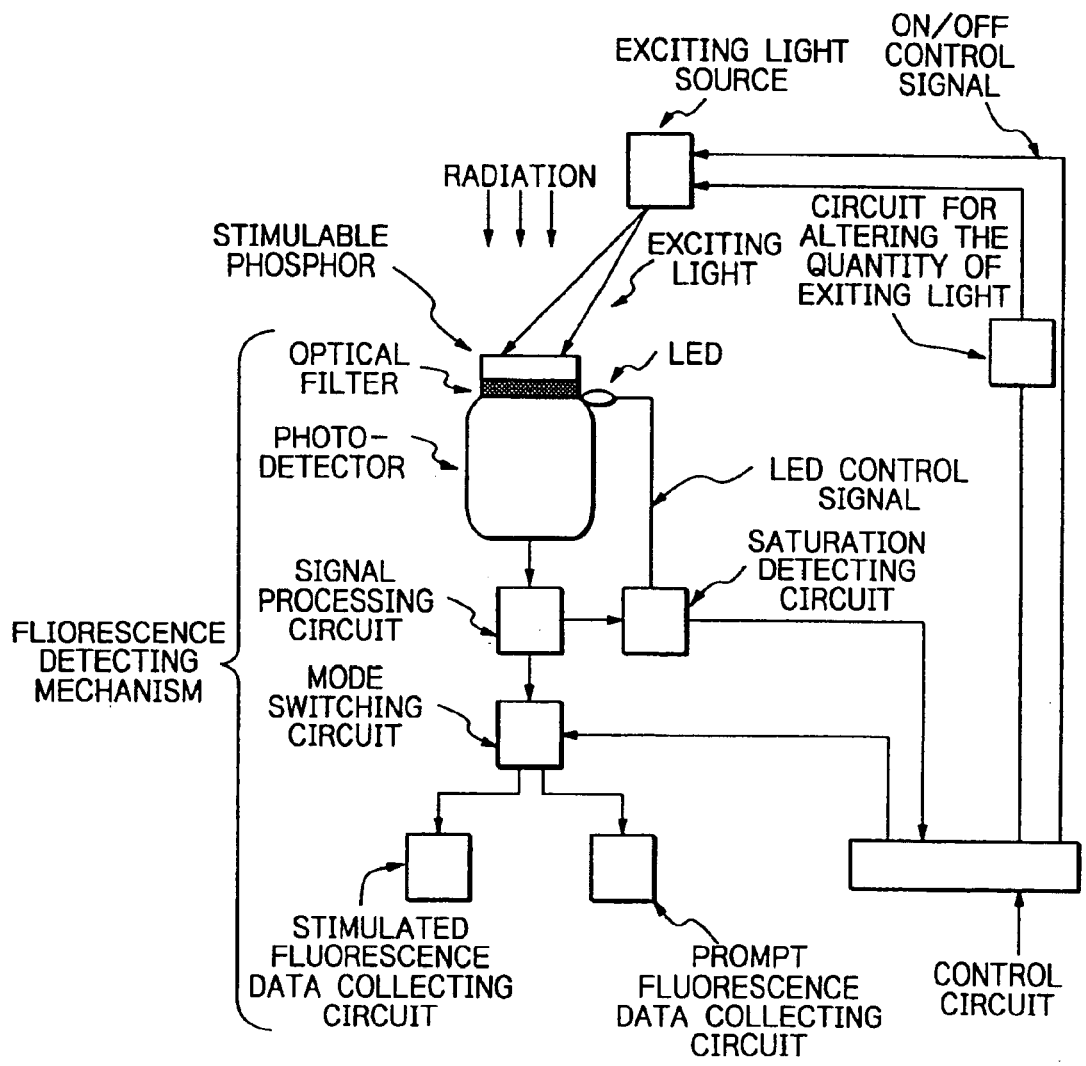
FIG. 4 shows one embodiment of the differential and integral-type apparatus for radiation measurement of the invention which relies upon reading the light of saturation detecting LED.

We now describe example 3 with reference to FIG. 4. The apparatus for radiation measurement shown in FIG. 4 comprises the following components: a stimulable phosphor serving as a radiation detecting medium; an exciting light source for illuminating the stimulable phosphor with exciting light to read the accumulated dose of radiation at specified time intervals; an optical bandpass filter centered at the wavelength of fluorescence; a photodetector for detecting stimulated fluorescence and prompt fluorescence; a signal processing circuit for amplifying and processing a stimulated fluorescence signal or a prompt fluorescence signal that are output from the photodetector; a mode switching circuit for switching between the stimulated fluorescence signal and the prompt fluorescence signal at specified time intervals; a saturation detecting circuit for monitoring the operation of the fluorescence detecting mechanism; an LED for use in saturation detection; a circuit for altering the quantity of exciting light; a control circuit for controlling the exciting light source, the mode switching circuit, the saturation detecting circuit and the light quantity altering circuit at specified time intervals; a stimulated fluorescence data collecting circuit for measuring stimulated fluorescence; a prompt fluorescence data collecting circuit for measuring prompt fluorescence; and a data processing circuit which collects stimulated and prompt fluorescence data at specified time intervals synchronously with the control circuit and determines the dose of incident radiation on the basis of the collected data.

The following are details of this apparatus for radiation measurement. In the example under consideration, a sheet of radiation detecting medium can be used, as exemplified by X-ray imaging plates of BAS Series commercially available from Fuji Photo Film Co., Ltd. The rear faces of the commercial X-ray imaging plates are not transparent but can be easily modified to become transparent. The stimulable phosphor used in these imaging plates is $BaFBr:Eu^{2+}$ and can be excited in a wavelength band of 490 nm–680 nm (where more than half of the maximum efficiency is exhibited). Upon illumination with exciting light, $BaFBr:Eu^{2+}$ emits stimulated fluorescence at a wavelength of 390 nm. While the example under consideration assumes the use of $BaFBr:Eu^{2+}$, other stimulable phosphors such as $KCl:Eu^{2+}$, $RbBr:Tl$, $SrS:Eu$ and $Sm$ may be used and imaging plates containing these as detection mediums can be used as specimen by altering the wavelength of exciting light and the wavelength of stimulated fluorescence to be read.

A laser is used as the light source of exciting light. The required laser power depends on the reading speed and the reading area of the imaging plate in the form of a stimulable phosphor sheet. If the detection area is a circle with a diameter of 5 mm, a power of at least several milliwatts is required. Since $BaFBr:Eu^{2+}$ in the imaging plates of BAS Series (Fuji Photo Film Co., Ltd.) can be excited in a wavelength band of 490 nm–680 nm, a laser operating in this wavelength band to produce high power with ease is either a semiconductor laser (635 nm) or a green-light laser (532 nm). The quantity of exciting light to be issued from the laser can be altered by a control signal output from the light quantity altering circuit. The exciting light can also be controlled to turn on and off by an ON/OFF control signal from the control circuit.

An optical bandpass filter centered at the wavelength of stimulated fluorescence is provided at the back of the imaging plate and the stimulated fluorescence emitted from the rear face of the imaging plate is passed through the filter to reject the unwanted scattering component of the exciting light. In the example under consideration, the stimulated fluorescence has a wavelength of 390 nm, so the optical filter should have a central wavelength of 390 nm.

We now describe the fluorescence detecting mechanism. The photodetector that can be used in the invention is a photomultiplier tube having high sensitivity around 390 nm which is the wavelength of stimulated fluorescence. Although not shown, a high bias voltage is applied to the photomultiplier tube. The light amplification factor depends on the applied bias voltage.

The optical signal detected by the photomultiplier tube is fed into the signal processing circuit where it is amplified and subjected to other signal processing. In the example under consideration, the optical signal is processed by photon counting. Specifically, the optical signal is subjected to the shaping of pulse waveform, discriminated from noise in a pulse height discriminator and picked up as a pulse signal. Alternatively, the reading method conventionally applied to imaging plates may be employed such that a train of stimulated fluorescence signals are integrated in an integrating circuit to read the accumulated dose of radiation.

The output pulse signal from the signal processing circuit is inputted to the mode switching circuit which, in response to a mode switching signal from the control circuit, supplies the pulse signal to either the stimulated fluorescence data collecting circuit if the operation is in a stimulated fluorescence mode, or the prompt fluorescence data collecting circuit if the operation is in a prompt fluorescence mode. In the example under consideration, the two data collecting circuits are each composed of a counting circuit.

Figure 5:
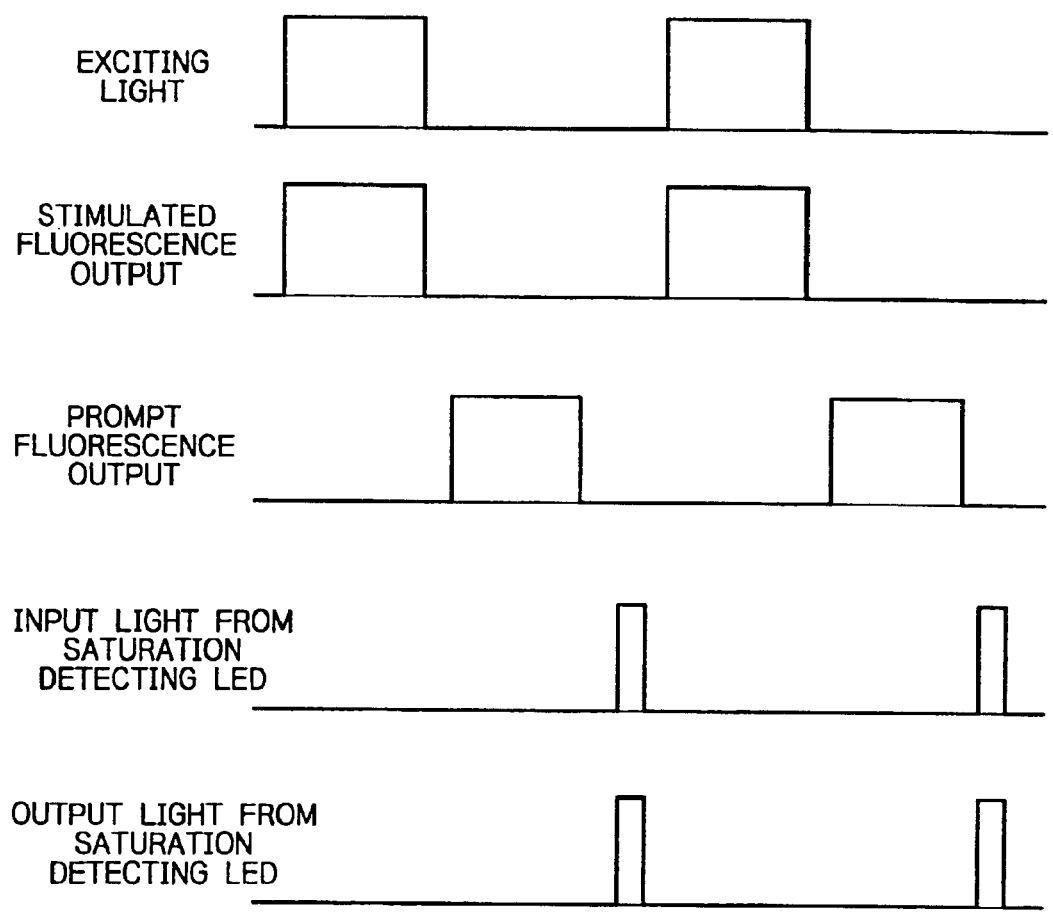
FIG. 5 is a timing chart for reading stimulated fluorescence and making surveillance for system saturation on the basis of time-division multiplexing.

Switching between the stimulated and the prompt fluorescence mode is performed by the control circuit on the timing shown in FIG. 5. While the imaging plate in the form of a stimulable phosphor sheet is illuminated with exciting light, stimulated fluorescence is read but, otherwise, prompt fluorescence is read. Hence, by controlling the exciting light source to emit exciting light synchronously with the reading cycles, both stimulated fluorescence and prompt fluorescence can be detected with a single fluorescence detecting mechanism at specified time intervals.

When stimulated fluorescence and prompt fluorescence are being detected from the imaging plate by the fluorescence detecting mechanism at specified time intervals during radiation measurement in or around an accelerator, an intense radiation may be incident within a short time to saturate the fluorescence detecting mechanism which is no longer operational. If this occurs, the photodetector is saturated and fails to operate, so no signal enters the signal processing circuit.

To catch this phenomenon positively, an LED is used that emits light of a wavelength that passes through the optical filter and the pulsed light from the LED is launched into the photodetector on the timing shown in FIG. 5, with the output signal from the signal processing circuit being constantly monitored by the saturation detecting circuit to check to see if the photodetector can detect the incident pulsed light. If not, the saturation detecting circuit finds the photodetector saturated and sends a saturation signal to the control circuit. The saturation detecting circuit continues the monitoring until the incidence of the rapid intense radiation has ended and the fluorescence detecting mechanism has recovered from saturation. When the saturated mechanism has restored to the normal state, the control circuit causes the mode switching circuit to send a mode switching signal, whereupon the operation is switched to the stimulated fluorescence mode and the photons in the stimulated fluorescence are counted to measure the dose of incidence of rapid and intense radiation.

When measuring the stimulated phosphor by this method, it is not known how much of the rapid and intense radiation has accumulated in the stimulable phosphor. To deal with this situation, the imaging plate is first illuminated with very weak exciting light and after knowing its quantity, the accumulated dose of radiation in the stimulable phosphor is read, thereby ensuring that the total dose of radiation accumulated in the stimulable phosphor is measured without causing saturation of the fluorescence detecting mechanism. Thus, according to example 3, the quantity of exciting light being applied to the stimulable phosphor is altered with the light quantity altering circuit on the basis of a signal from the control circuit while using the saturation detecting circuit as an auxiliary and this enables the dose of accumulated radiation to be read from the stimulable phosphor without saturating the fluorescence detecting mechanism.

Figure 6:
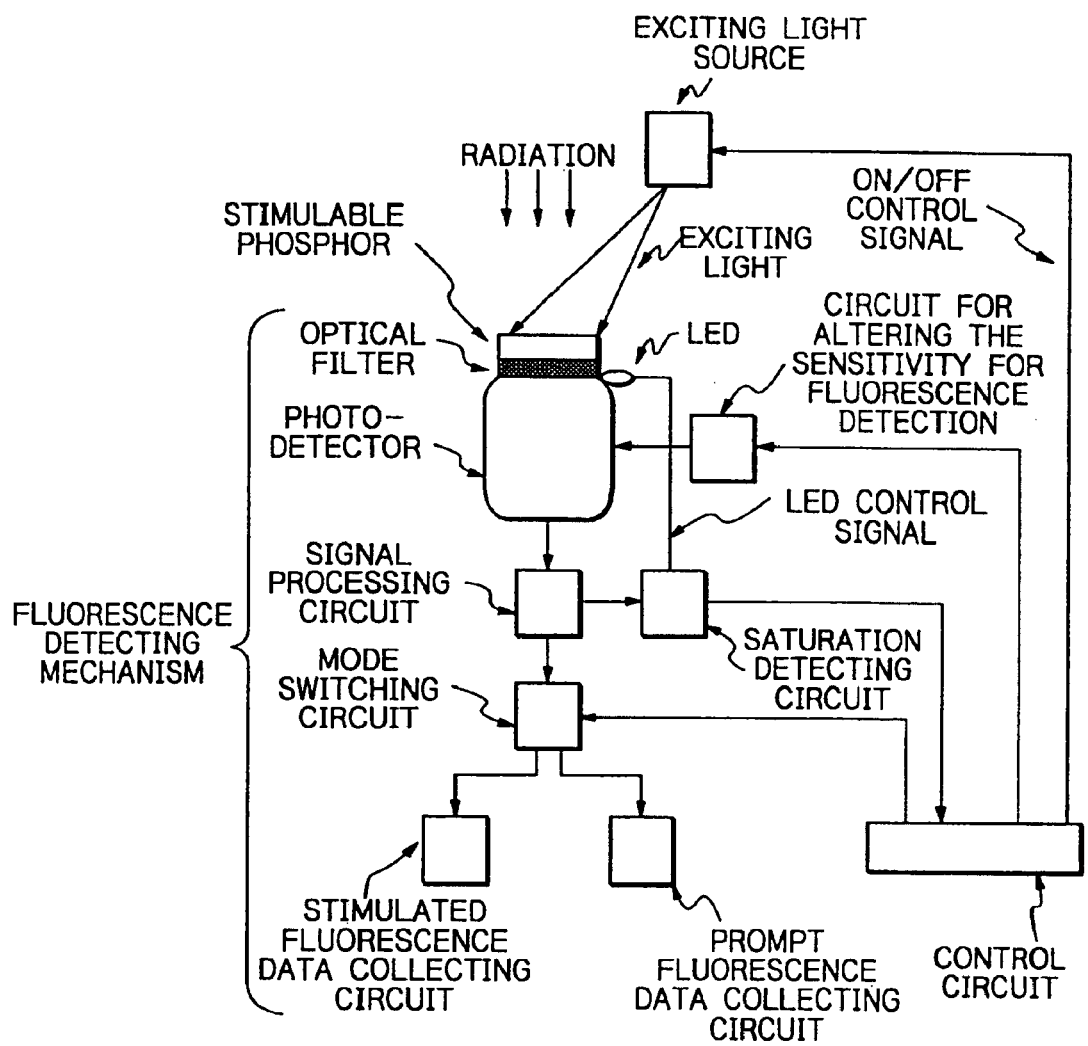
FIG. 6 shows another embodiment of the differential and integral-type apparatus for radiation measurement of the invention which relies upon reading stimulated fluorescence with an altered sensitivity for fluorescence detection.
Figure 7:
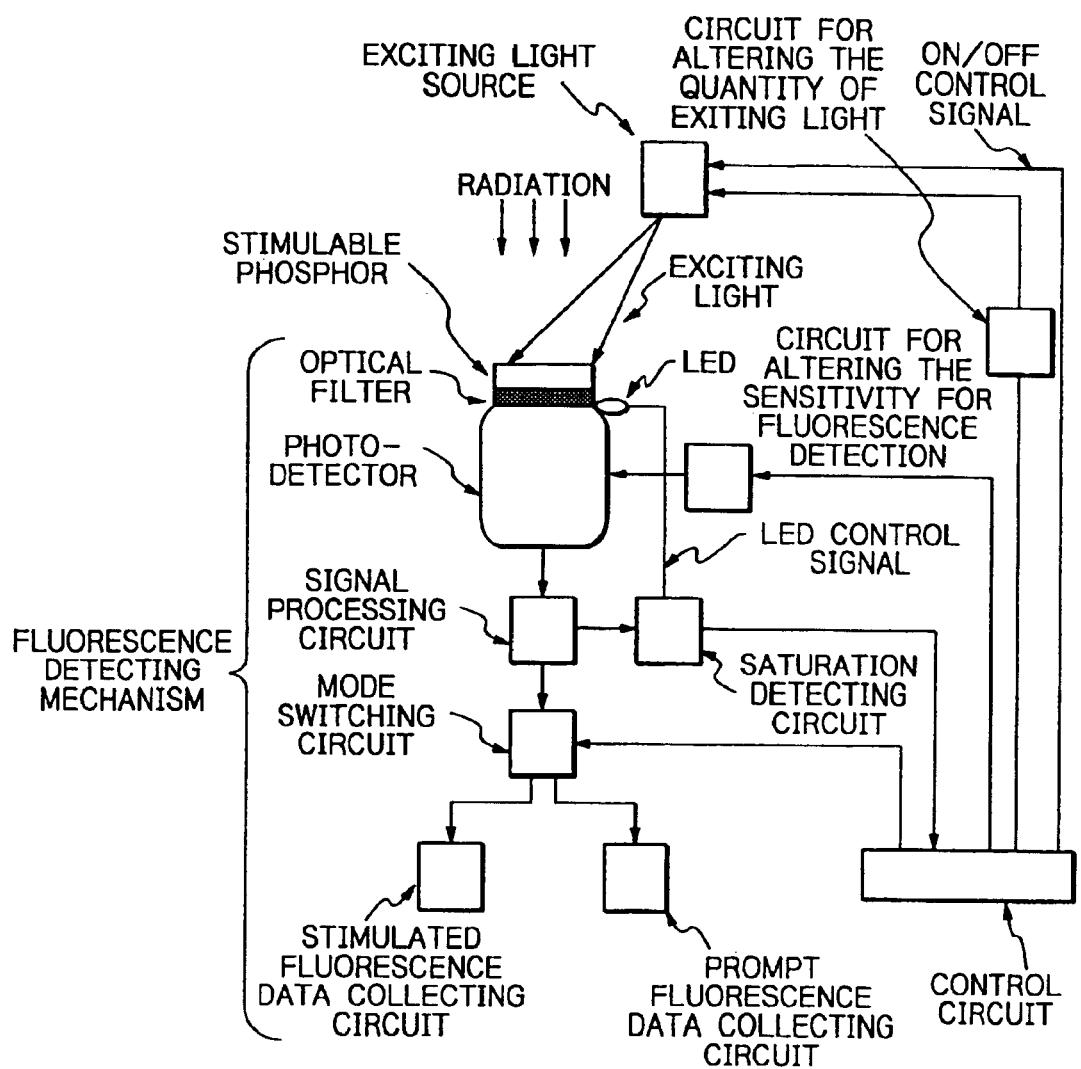
FIG. 7 shows yet another embodiment of the differential and integral-type apparatus for radiation measurement of the invention which relies upon reading stimulated fluorescence with an altered quantity of exciting light.

We now describe example 4 with reference to FIG. 6. In the previous example, the dose of an intense radiation that was incident within a short time is measured by counting the photons in stimulated fluorescence after fluorescence detecting mechanism has recovered from saturation. The same object (reading without saturation of the fluorescence detecting mechanism) can be attained by altering the sensitivity of the fluorescence detecting mechanism. In the example under consideration which uses a photomultiplier tube as the photodetector, a bias voltage altering circuit is used to alter the sensitivity for fluorescence detection and the intended operation is performed by controlling the bias voltage with the control circuit We now describe example 5 with reference to FIG. 7. This is the combination of examples 3 and 4 and is characterized in that if an extremely large quantity of radiation is incident, the sensitivity for fluorescence detection is lowered by the sensitivity altering circuit and the time taken by measurement of stimulated fluorescence is shortened. According to example 5, this and other methods may be used to optimize the reading of stimulated fluorescence.

Figure 8:
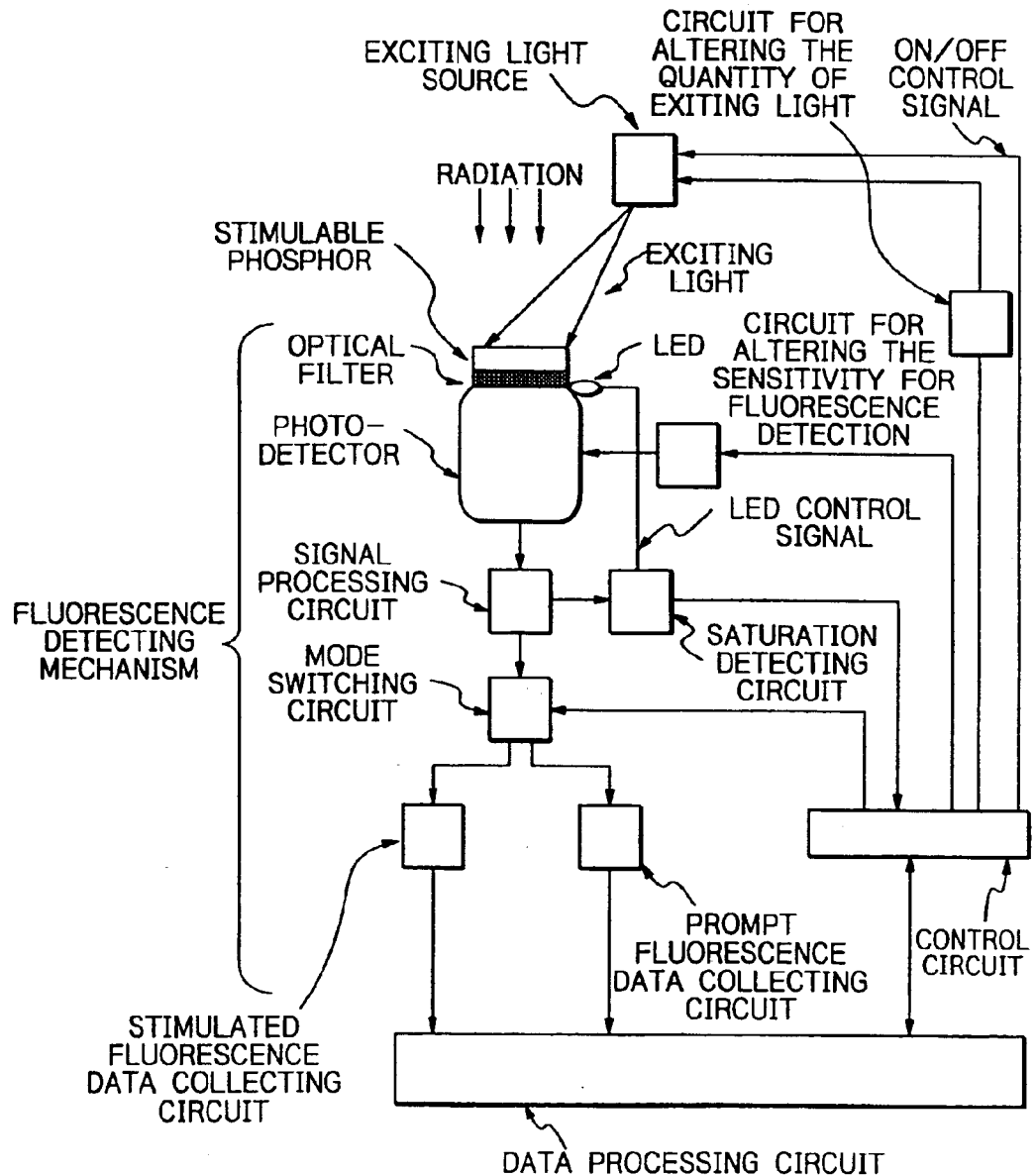
FIG. 8 shows still another embodiment of the differential and integral-type apparatus for radiation measurement of the invention which relies upon correcting the effect of prompt fluorescence that is incident by chance during radiation measurement with stimulated fluorescence.

We now describe example 6 with reference to FIG. 8. When the dose of incident radiation is measured at specified time intervals by counting the photons in stimulated fluorescence in the foregoing examples using a mechanism for detecting stimulated fluorescence and prompt fluorescence, the imaging plate may incidentally be illuminated with a radiation during the reading process and counted in the result of measurement. To deal with this situation, the contribution from the prompt fluorescence is corrected with the data processing circuit on the basis of the dose of radiation measured at specified time intervals by counting the photons in prompt fluorescence using the fluorescence detecting mechanism and, as a result, the total dose of incident radiation can be correctly measured.

Figure 9:
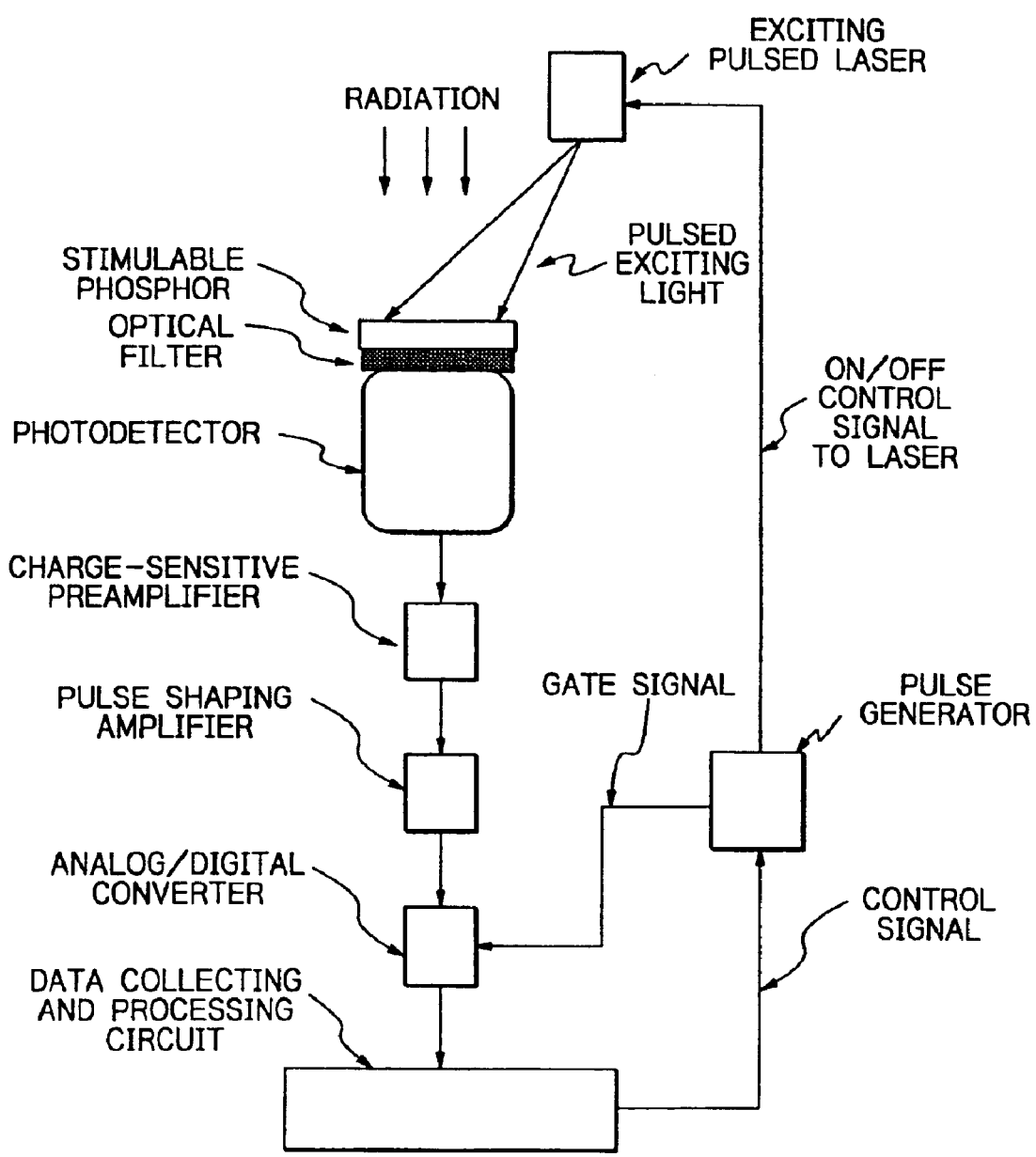
FIG. 9 shows an apparatus for implementing another embodiment of the method of radiation measurement of the invention which reads the dose of accumulated radiation in a stimulable phosphor upon illumination with pulsed-exciting light.

We now describe example 7 with reference to FIG. 9. Example 7 relates to a method applicable to an apparatus for radiation measurement using a stimulable phosphor and which is characterized by an improvement in the manner in which the dose of radiation accumulated in the stimulable phosphor is read.

The invention is particularly applicable to the case where a stimulable phosphor of short fluorescence lifetime ($\leq 2 \mu s$) is used as a radiation detecting medium and characterized by applying the following signal processing technique which is conventionally used in processing signals from a semiconductor detector. In the example under consideration, BaFBr:Eu$^{2+}$ with a fluorescence lifetime of 0.8 $\mu s$ is used as a radiation detecting medium.

Figure 10:
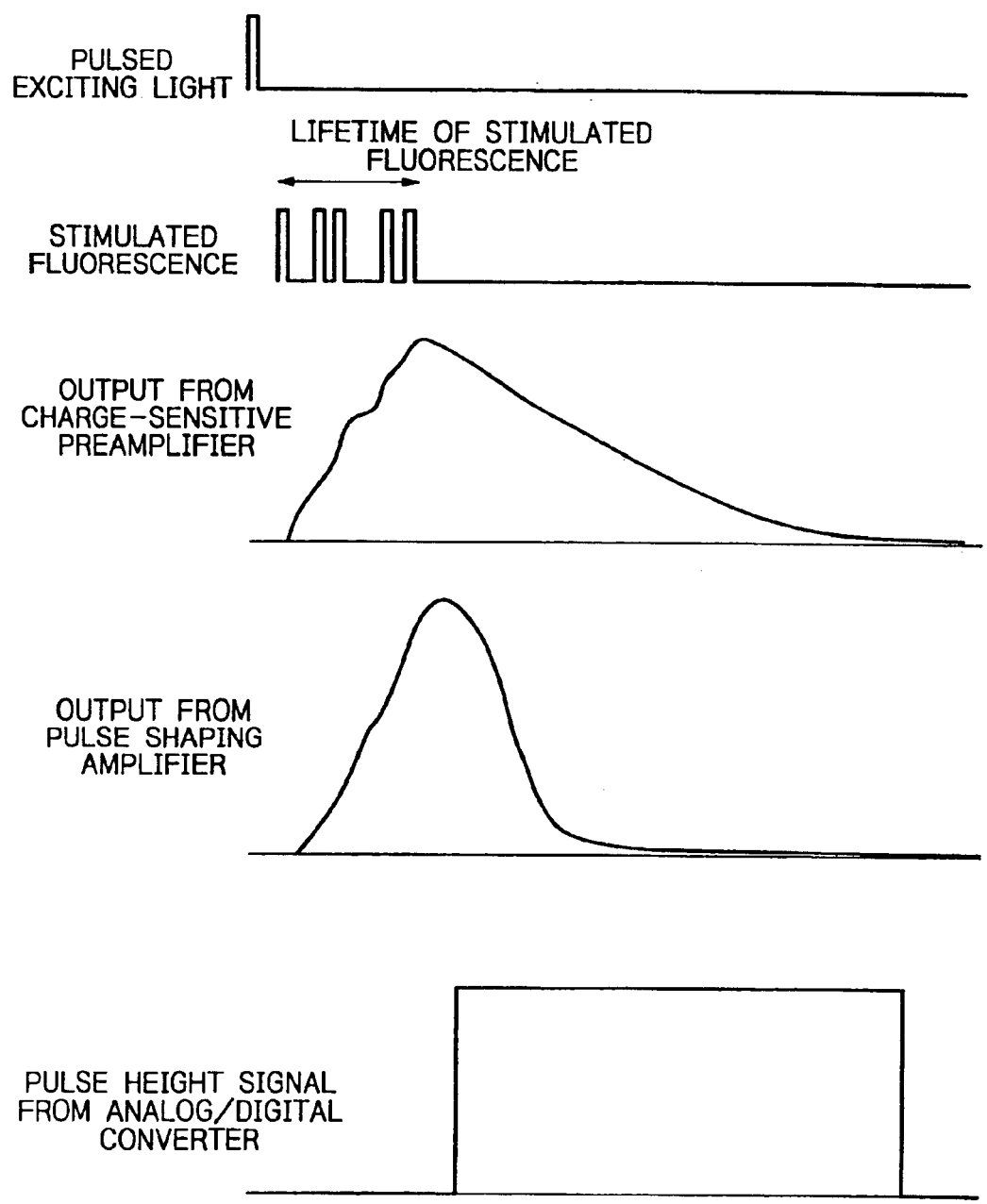
FIG. 10 is a timing chart for signals generated in the method of radiation measurement using the embodiment of FIG. 9 which reads the dose of accumulated radiation in a stimulable phosphor upon illumination with pulsed exciting light.

To read the dose of radiation accumulated in this stimulable phosphor, the latter is illuminated with pulsed exciting light from a light source having an irradiation time duration not longer than the lifetime of stimulated fluorescence. In the example under consideration, a pulsed green-light laser is used as a source of pulsed exciting light. This laser issues pulses of a very short duration of 2 ns. When the stimulable phosphor is illuminated with such pulsed exciting light, there occurs random emission of stimulated fluorescence as shown by timing diagram in FIG. 10. Since this emission practically ends within the lifetime of stimulated fluorescence, the emitted fluorescence is detected with a photodetector such as a photomultiplier tube and the detected signal is amplified with a charge sensitive preamplifier to produce an output signal also shown in the timing diagram. The output signal is inputted to a pulse shaping amplifier typically composed of an integrating and differentiating circuit so that it is subjected to both waveform shaping with a time constant longer than the lifetime of stimulated fluorescence from the stimulable phosphor and amplification. This procedure produces a pulse height signal which is an integral of the stimulated fluorescence emitted upon illumination with pulsed exciting light. The pulse height signal is then inputted to an analog/digital converter to determine the pulse height. The dose of radiation accumulated in the stimulable phosphor can be determined by a data collecting and processing circuit which integrates the pulse height obtained for each pulse of the exciting light that issues from the pulsed laser light source in response to a laser control signal sent from a pulse generator.

Figure 11:
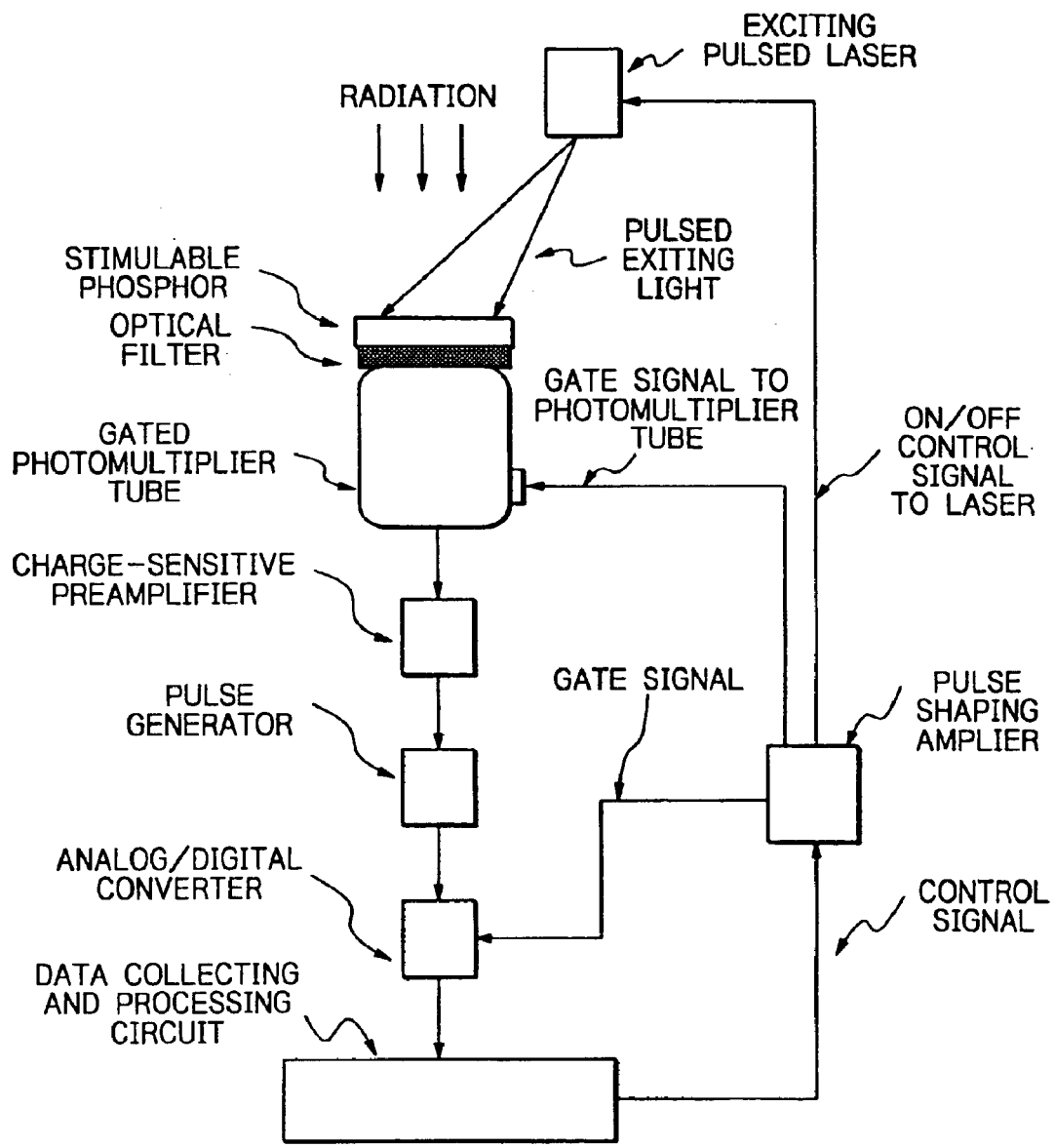
FIG. 11 shows an apparatus for implementing another embodiment of the method of radiation measurement which reads the dose of accumulated radiation in a stimulable phosphor using a gated photomultiplier tube as a photodetector.

We now describe example 8 with reference to FIG. 11. The example is a modification of the radiation detecting apparatus recited in example 3 and characterized by using a gated photomultiplier tube as the photodetector. An example of the gated photomultiplier tube that can be used is R5916 manufactured by Hamiamatsu Photonics. If BaFBr:Eu$^{2+}$ is used as a stimulable phosphor, the already mentioned green-light laser emitting pulses of a duration of 2 ns can be used as an exciting light source. In the example under consideration, a gate signal having a time duration of 5 ns is input to the gated photomultiplier tube synchronously with the illumination of the stimulable phosphor with the pulsed exciting light such that the photomultiplier tube remains off as long as the illumination continues but turns on when the gate is controlled after illumination with the exciting light. This procedure enables the stimulated fluorescence from the excited stimulable phosphor to be detected without being affected by illumination with the pulsed exciting light. In other words, the radiation measuring apparatus recited in example 8 is capable of determining the dose of radiation in a stimulable phosphor without being affected by illumination with the pulsed exciting light.

Figure 12:
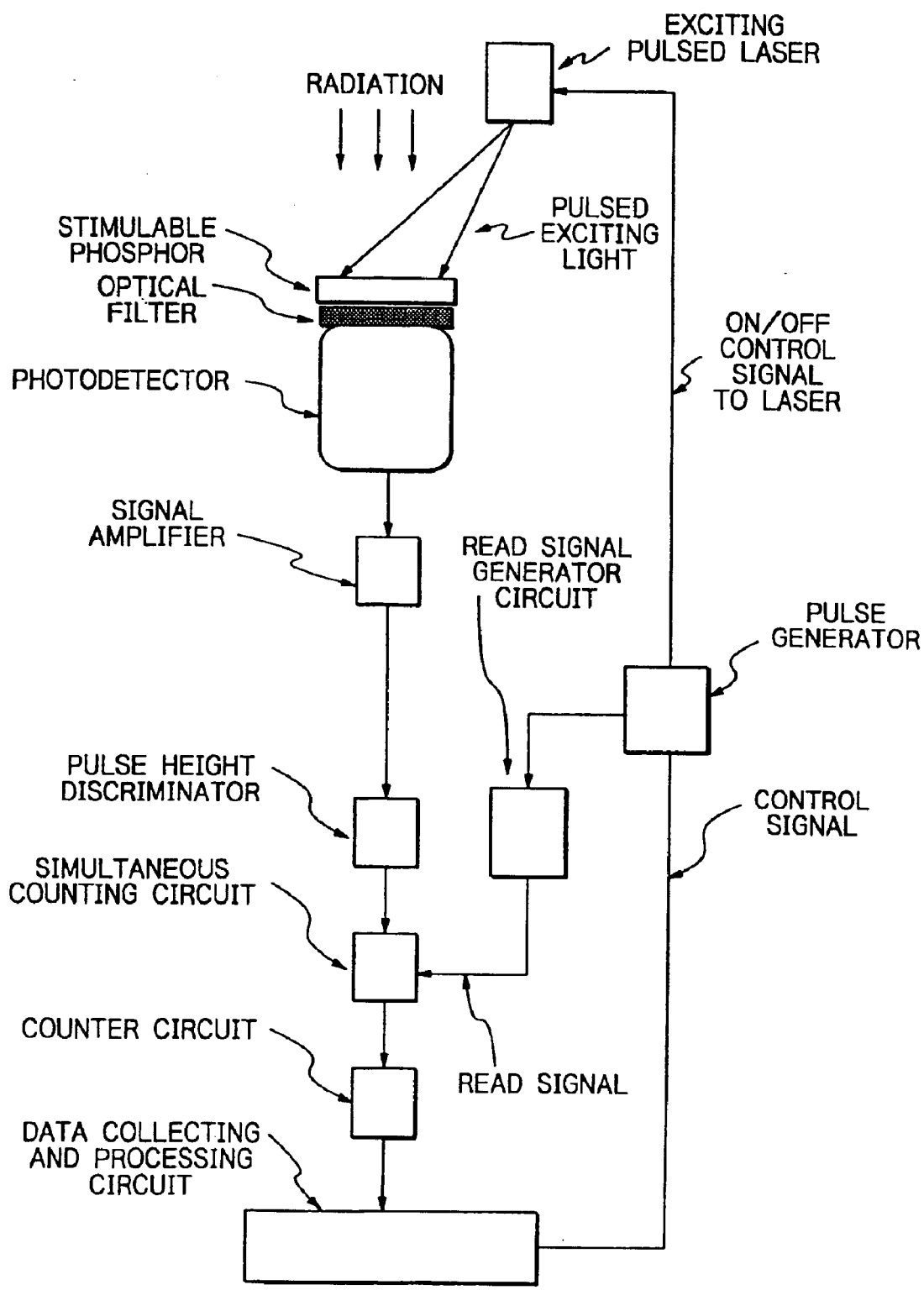
FIG. 12 shows an apparatus for implementing still another embodiment of the method of radiation measurement of the invention which reads the dose of accumulated radiation in a stimulable phosphor by coincident counting of photons in pulsed exciting light and stimulated fluorescence signals.

We now describe example 9 with reference to FIG. 12. Like examples 7 and 8, the invention recited in example 9 relates to a method applicable to an apparatus for radiation measurement using a stimulable phosphor and which is characterized by an improvement in the manner in which the dose of radiation accumulated in the stimulable phosphor is read. The improved method is particularly applicable to the case where a stimulable phosphor of short fluorescence lifetime ($\leq 2\mu$) is used as a radiation detecting medium, provided that a moderate intensity of radiation has been accumulated in the stimulable phosphor. In the example under consideration; BaFBr:Eu$^{2+}$ having a fluorescence lifetime of 0.8 $\mu s$ is used as the radiation detecting medium.

Figure 13:
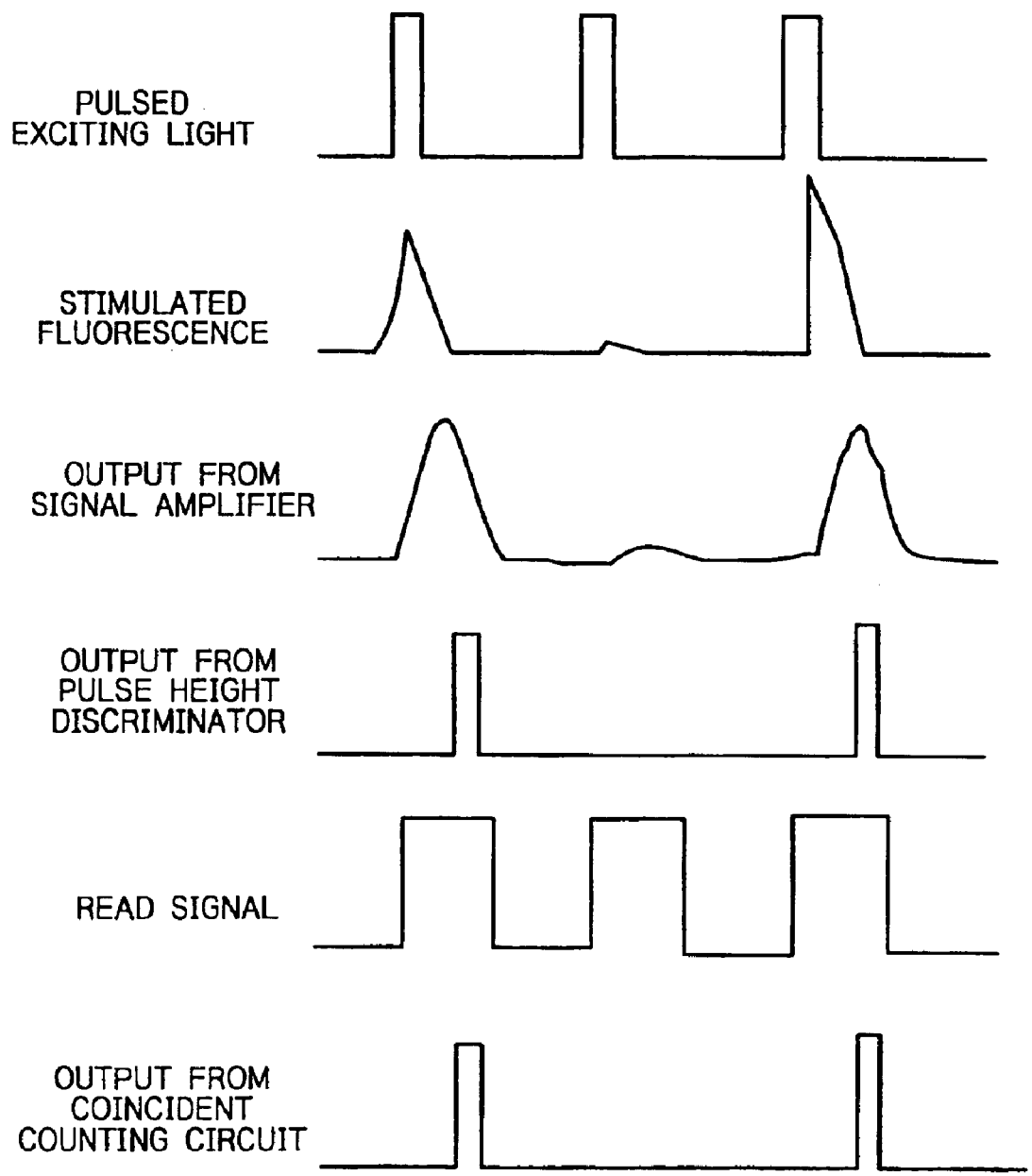
FIG. 13 is a timing chart for coincident counting of stimulated fluorescence signals and reading signals constructed from pulsed exciting light.

To read the dose of radiation accumulated in this stimulable phosphor, the latter is illuminated with pulsed exciting light from a light source having an irradiation time duration not longer than the lifetime of stimulated fluorescence. In the example under consideration, in order to read the dose of radiation accumulated in the stimulable phosphor having a fluorescence lifetime of 0.8 $\mu s$, the stimulable phosphor is illuminated with pulsed exiting light from a light source capable of illumination for a time duration twice the lifetime of the fluorescence stimulated from the stimulable phosphor (0.8 $\mu s \times 2 = 1.6 \mu s$). If the dose of the accumulated radiation is moderate, the timing of the emission of stimulated fluorescence is random and a single pulse of it may or may not be emitted synchronously with the pulsed exciting light as shown by timing diagram in FIG. 13. The emitted fluorescence is detected with a photodetector such as a photomultiplier tube and the detected signal is amplified with a preamplifier and a signal amplifier, from which an amplified signal is output as also shown in the timing diagram. The output signal is inputted to a pulse height discriminator which outputs a digital signal also shown in the timing diagram. The output signal from the pulse height discriminator is fed into a coincident counting circuit and subjected to coincident counting with a read signal constructed by a read signal generator circuit using a signal indicating the time duration of illumination with the pulsed exciting light. This signal is constructed by a pulse generator as it generates a signal for controlling the laser from the pulsed exciting light source. The output signal from the coincident counting circuit corresponds to a single pulse of stimulated fluorescence that is being captured in response to illumination with the exciting light. The dose of radiation accumulated in the stimulable phosphor can be determined by counting the number of output signals from the coincident counting circuit with a counter circuit and subjecting the result to data processing in a data collecting and processing circuit.

Figure 14A:
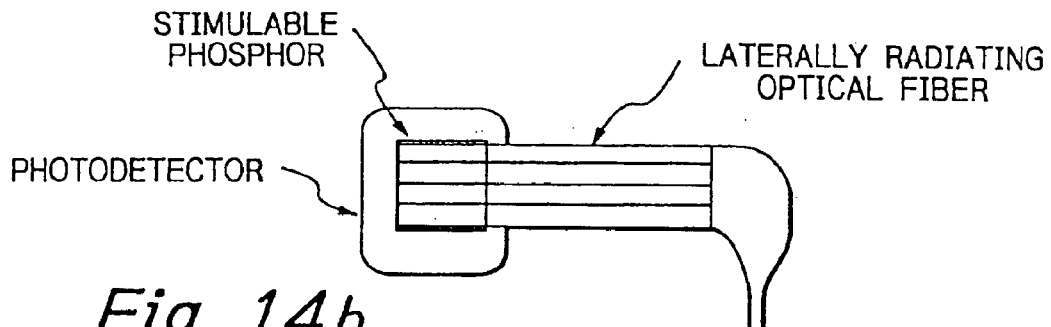
FIG. 14 shows an apparatus for implementing another embodiment of the method of radiation measurement of the invention which uses a stimulable phosphor to be illuminated with exciting light through laterally radiating optical fibers.
Figure 14B:
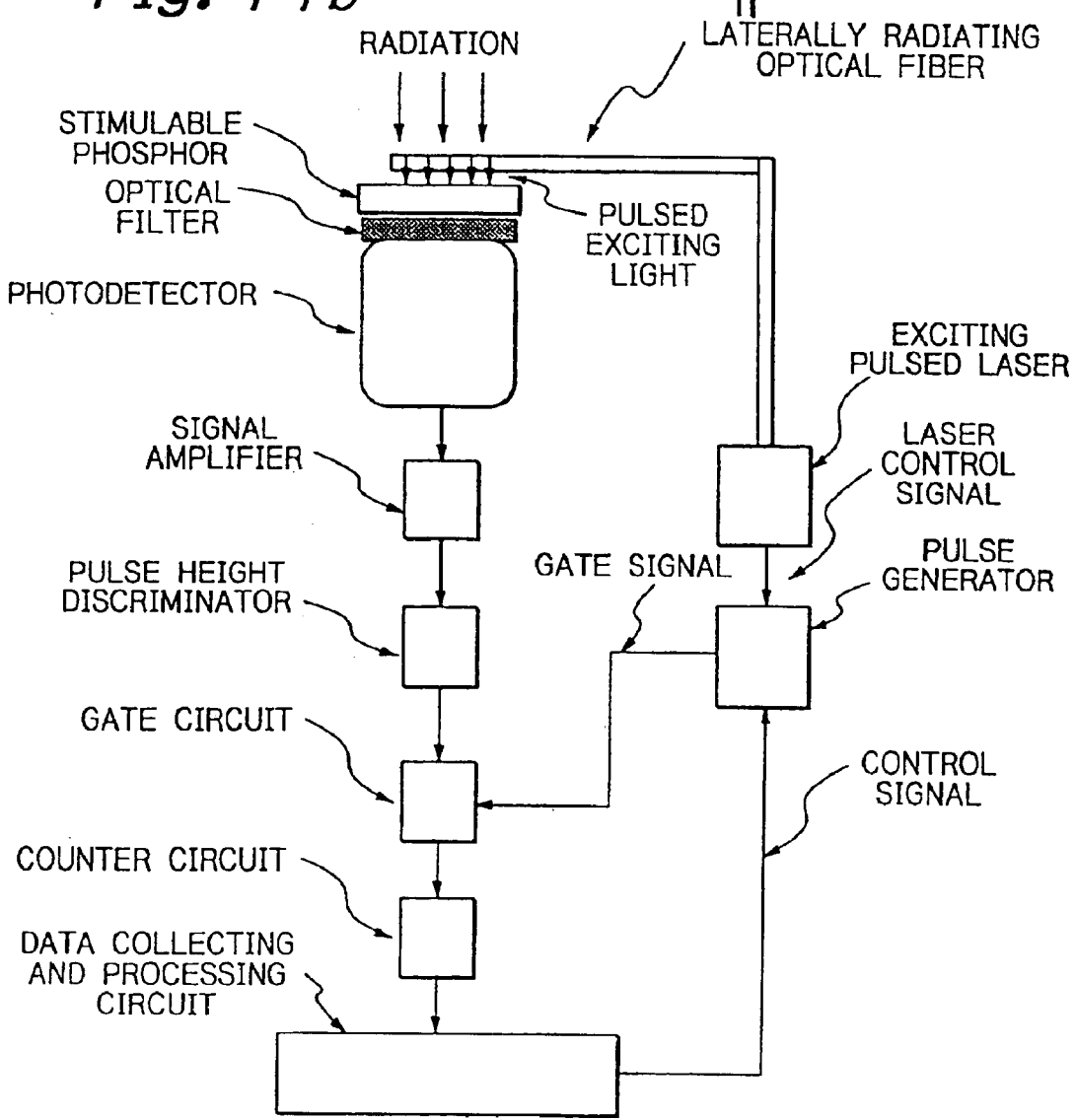

We now describe example 10 with reference to FIG. 14. This is an improvement of a mechanism for illuminating the stimulable phosphor as a radiation detecting medium with exciting light to read the dose of radiation accumulated in the stimulable phosphor and is characterized by using a laterally radiating optical fiber as a radiator of exciting light in the mechanism. The example under consideration is the same as the method of example 7 which measures the dose of radiation accumulated in the stimulable phosphor, except that the exciting light from the pulsed laser light source is not directly applied to the stimulable phosphor but applied via the illustrated laterally radiating optical fiber. An example of the laterally radiating optical fiber that can be used is LUMINAS V Grade which is a laterally leaky optical fiber manufactured by Asahi Chemical Industry. A conventional optical fiber can be used as a laterally radiating type if a thin layer is removed from the entire circumference. The use of the laterally radiating optical fiber permits remote sensing by eliminating the need to install the exciting light source at the site of radiation detection.

We now describe example 11 with reference to FIG. 15. This example is a modification of example 10, in which an optical fiber that radiates light from a portion of its circumference as shown enlarged in the inset is used as the lateral radiator in the mechanism for illuminating the stimulable phosphor with exciting light. A conventional optical fiber can be used as such semilaterally radiating type if a thin layer is removed from a limited part of the circumference. The use of a semi-laterally radiating optical fiber eliminates the need to install the exciting light source at the site of radiation detection and permits efficient reading of the dose of radiation in the stimulable phosphor by radiating light only in a specified direction.

Figure 16A:
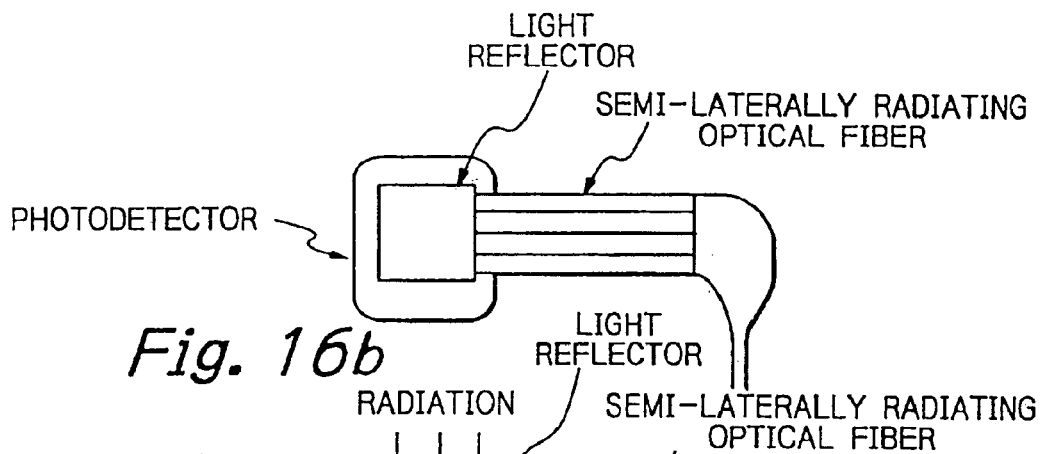
FIG. 16 shows an apparatus for implementing yet another embodiment of the method radiation measurement of the invention which uses a stimulable phosphor to be illuminated with exciting light through semi-laterally radiating optical fibers in the presence of a light reflector at their back.
Figure 16B:
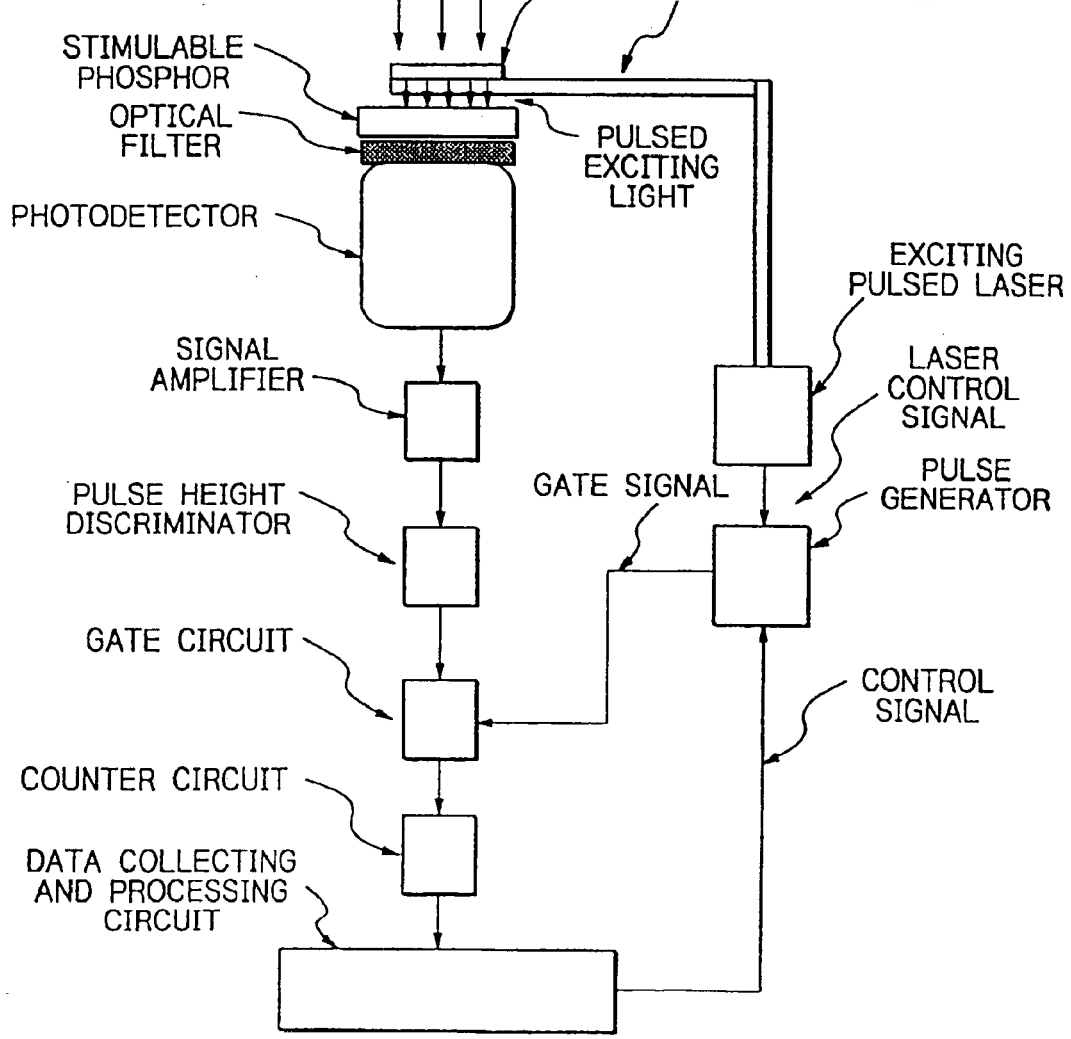

We now describe example 12 with reference to FIG. 16. This example is a modification of example 11, in which the semi-laterally radiating optical fiber is overlaid with a light reflector which is remote from the light radiating part of the fiber so that leaking light is sufficiently reflected back to the radiating part to radiate as much light as possible. This design permits more efficient reading of the dose of radiation accumulated in the stimulable phosphor.

Figure 17A:
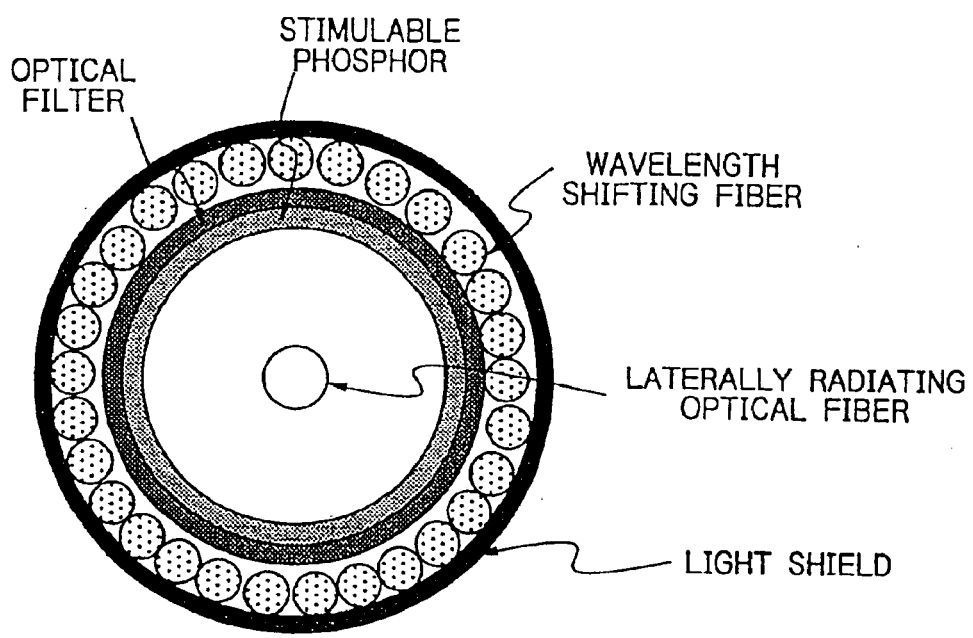
FIG. 17 shows a radiation detecting portion for use in an embodiment of the method of of the invention which employs a stimulable phosphor in combination with a laterally radiating optical fiber and wavelength shifting optical fibers sensitive to the wavelength of fluorescence.
Figure 17B:
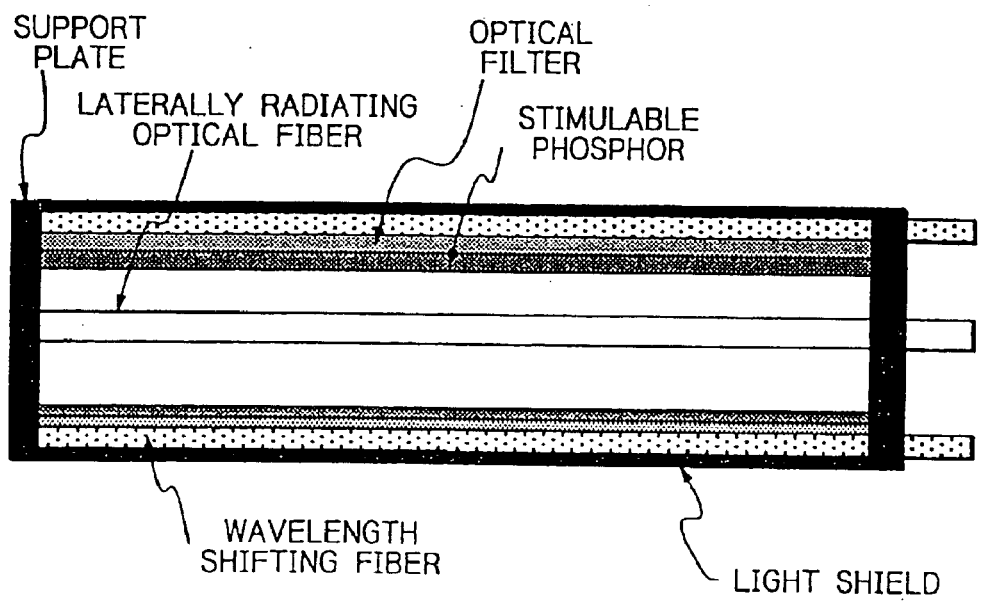

We now describe example 13 with reference to FIG. 17. The radiation detecting portion in this example uses a cylinder of stimulable phosphor; more specifically, it comprises in superposition an optical fiber capable of lateral radiation of light, a stimulable phosphor as a radiation detecting medium that is spaced from the optical fiber, an optical bandpass filter centered at the wavelength of fluorescence which is disposed outside the stimulable phosphor, and a multiple of wavelength shifting fibers that are sensitive to the wavelength of fluorescence and which are disposed around the optical filter to detect both stimulated fluorescence and prompt fluorescence. The outermost part of the radiation detecting portion is covered with a light shield. The stimulable phosphor is $BaFBr:Eu^{2+}$ that emits stimulated fluorescence at 390 nm which has a lifetime of 0.8 $\mu$s. In view of the wavelength of the stimulated fluorescence which is 390 nm in the example under consideration, a fluorescent plastic fiber having an excitation wavelength range of 320 nm–395 nm and emitting fluorescence centered at the wavelength of 450 nm is used as the wavelength shifter. The wavelength shifted fluorescence has a lifetime not longer than 10 ns. The radiation detecting portion using the wavelength shifting fiber sensitive to stimulated fluorescence at 390 nm not only enables complete remote sensing but also increases the detecting area of the stimulable phosphor as a radiation detecting medium by a sufficient amount to enhance the sensitivity for radiation detection. The example under consideration can be used as a highly sensitive detector of a radioactive gas that is introduced into the space between the laterally radiating optical fiber and the stimulable phosphor.

Figure 18A:
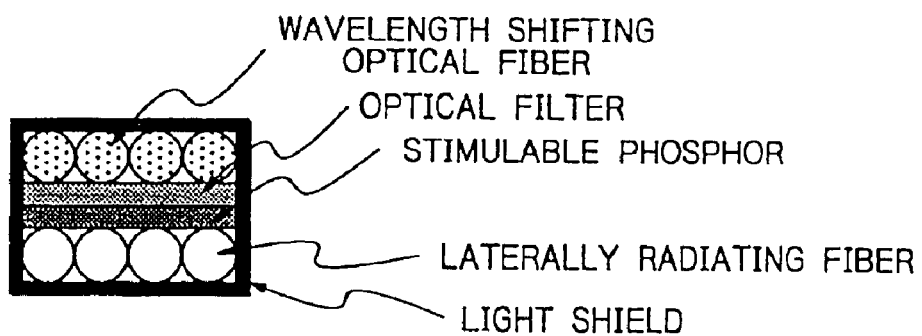
FIG. 18 shows a radiation detecting portion for use in another embodiment of an apparatus of the invention which is a planar array consisting, in superposition, of laterally radiating optical fibers, a stimulable phosphor, an optical filter and wavelength shifting optical fibers.
Figure 18B:
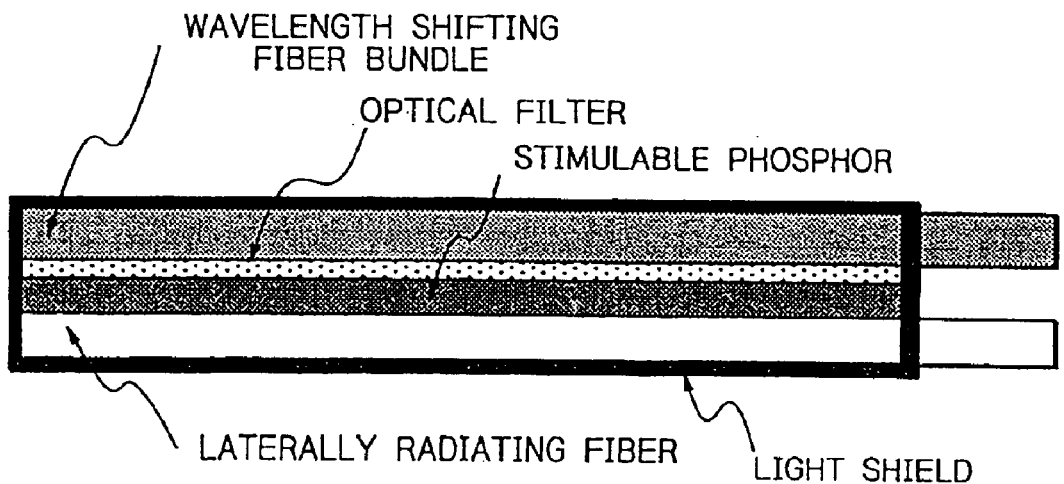
Figure 19:
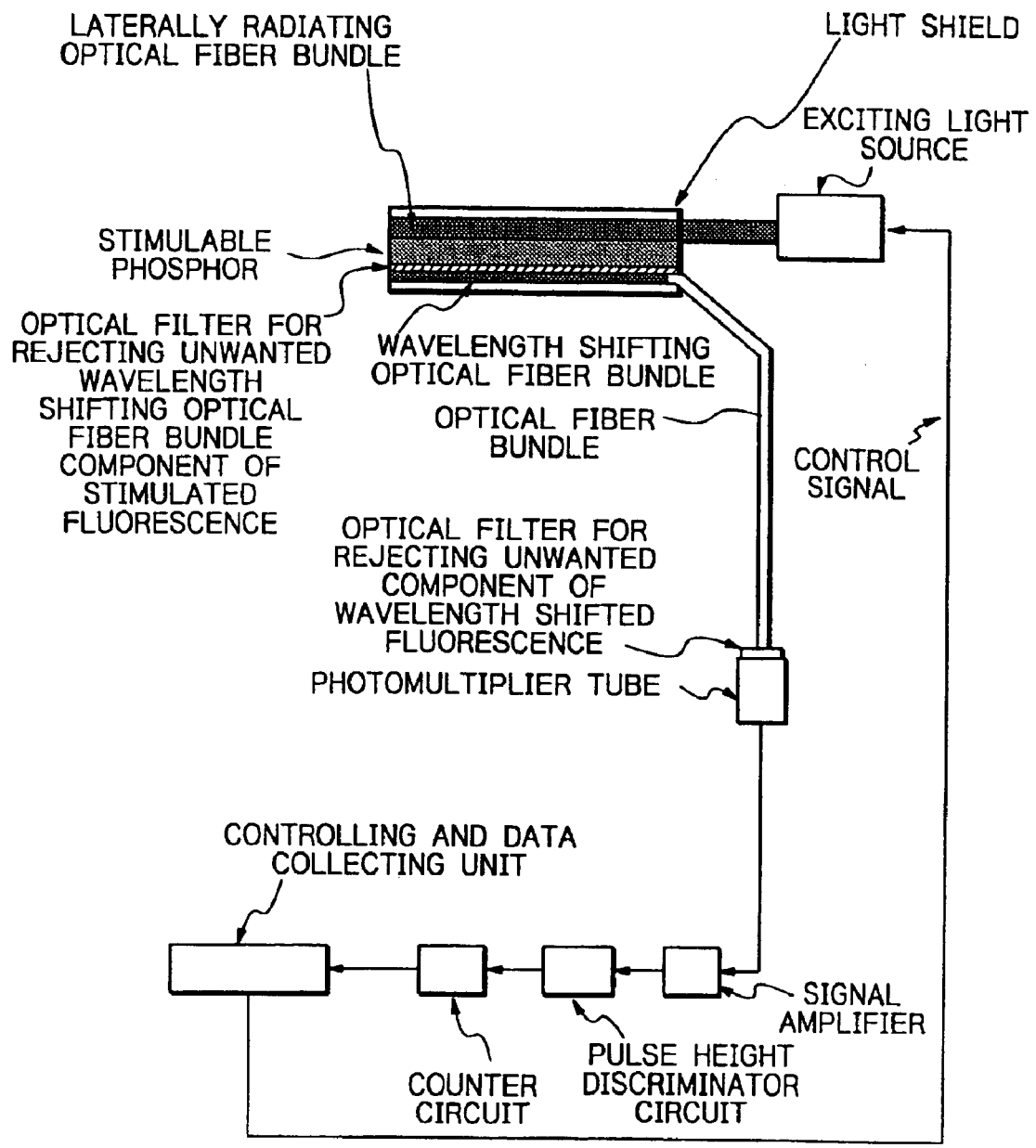
FIG. 19 shows an apparatus for radiation measurement that uses the radiation detecting portion shown in FIG. 18.

We now describe example 14 with reference to FIG. 18. In this example, too, $BaFBr:Eu^{2+}$ having a fluorescence lifetime of 0.8 $\mu$s is used as a stimulable phosphor. The radiation detecting portion in this example comprises the following components in planar superposition: four optical fibers with a diameter of 1 mm that are capable of lateral radiation of light; a stimulable phosphor as a radiation detecting medium; an optical bandpass filter centered at the wavelength of fluorescence; and four wavelength shifting fibers with a diameter of 1 mm that are sensitive to the wavelengths of stimulated fluorescence and prompt fluorescence and which are used to detect both types of fluorescence. An exemplary apparatus for measuring radiation using this radiation detecting portion is shown in FIG. 19. Using this radiation detecting portion, one can perform complete remote sensing. In addition, the cross-sectional size of the radiation detecting portion can be reduced to less than 1 cm×1 cm, which is small enough to permit easy radiation measurement even if the installation area is small or the detecting portion is quite long.

Figure 20A:
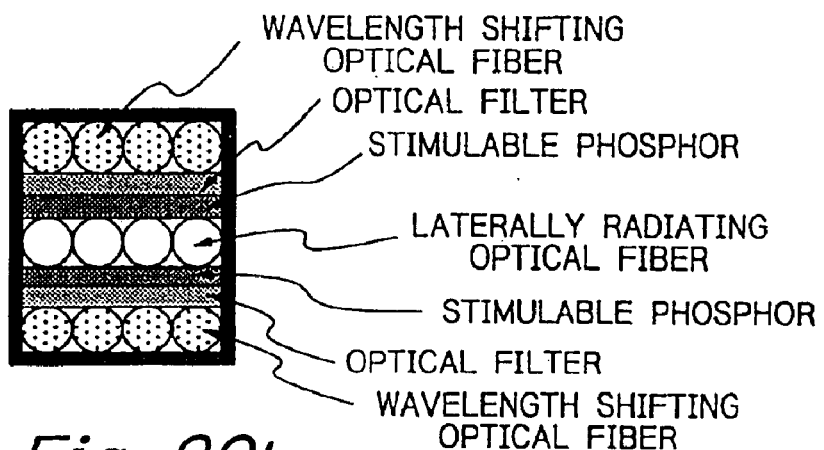
FIG. 20 shows a radiation detecting portion for use in another embodiment of an apparatus of the invention which is a ribbon array of laterally radiating optical fibers sandwiched between assemblies each consisting of a stimulable phosphor, an optical filter and a ribbon array of wavelength shifting optical fibers.
Figure 20B:
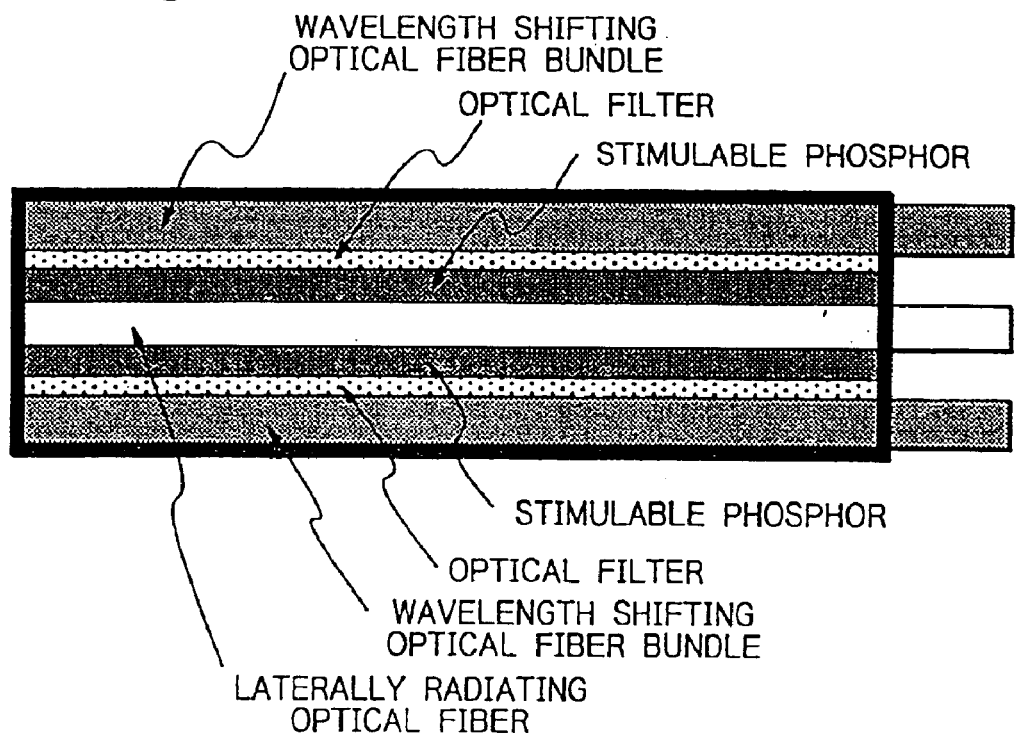

We now describe example 15 with reference to FIG. 20. The radiation detecting portion used in this example has a ribbon array of four optical fibers with a diameter of 1 mm that are capable of lateral radiation of light and which are sandwiched between two units of the following components in planar superposition: a stimulable phosphor as a radiation detecting medium; an optical bandpass filter centered at the wavelength of fluorescence; and four wavelength shifting fibers with a diameter of 1 mm that are sensitive to the wavelengths of stimulated fluorescence and prompt fluorescence and which are used to detect both types of fluorescence. Since the stimulable phosphor is provided on each side of the radiation detecting portion, not only can detection sensitivity be increased but also the direction of incidence of radiation can be estimated.

Figure 21A:
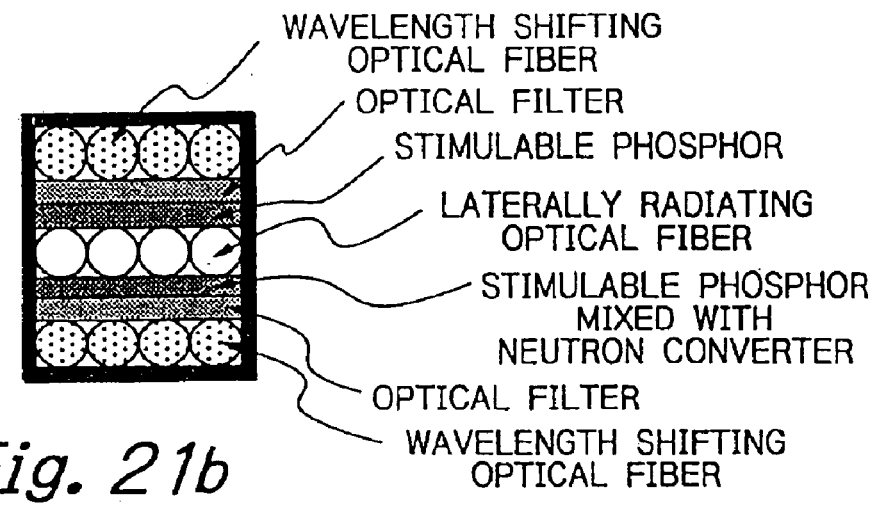
FIG. 21 shows a radiation detecting portion for use in another embodiment of the apparatus of the invention which is a ribbon array of laterally radiating optical fibers sandwiched between assemblies consisting of different stimulable phosphors, an optical filter and a ribbon array of wavelength shifting optical fibers.
Figure 21B:
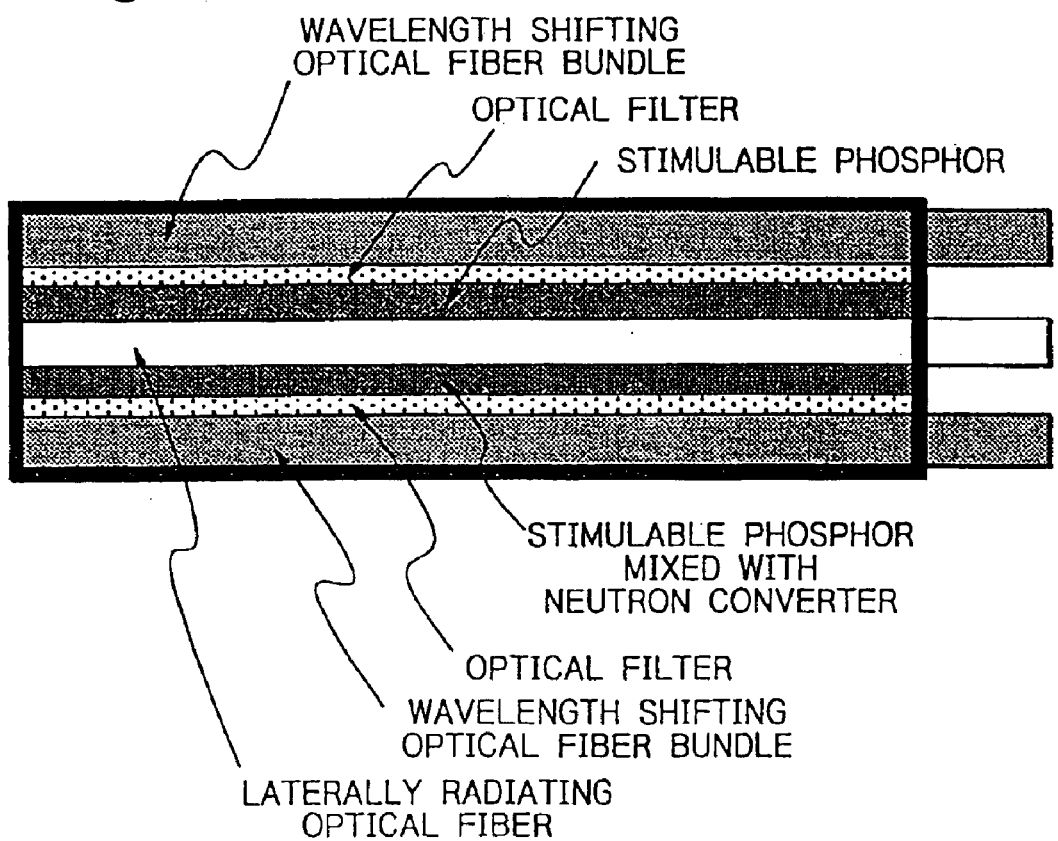

We now describe example 16 with reference to FIG. 21. As in the previous example, the radiation detecting portion has a ribbon array of four optical fibers with a diameter of 1 mm that are capable of lateral radiation of light and which are sandwiched between two units of the following components in planar superposition: a stimulable phosphor as a radiation detecting medium; an optical bandpass filter centered at the wavelength of fluorescence; and four wavelength shifting fibers with a diameter of 1 mm that are sensitive to the wavelengths of stimulated fluorescence and prompt fluorescence and which are used to detect both types of fluorescence. The stimulable phosphor on one side is just the same as described above but the stimulable phosphor on the other side is adapted to be capable of detecting neutrons by mixing with Gd which is a neutron converter that converts neutrons to an ionizable radiation. This design allows for detection of neutrons in addition to ionizing radiations such as X-rays and gamma-rays. Some X-rays and gamma-rays are sensitive to the mixture of the neutron converter and the stimulable phosphor but their effects can be corrected on the basis of the data captured with the stimulable phosphor alone; hence, the dose of neutrons can be measured with high precision.

We now describe example 17 with reference to FIG. 22. In this example, too, BaFBr:Eu$^{2+}$ having a fluorescence lifetime of 0.8 µs is used as a stimulable phosphor. The radiation detecting portion in this example is in a cylindrical form and comprises in superposition a single optical fiber with a diameter of 1 mm that is capable of lateral radiation of light, a stimulable phosphor as a radiation detecting medium, an optical bandpass filter centered at the wavelength of fluorescence, and a multiple of wavelength shifting fibers that are sensitive to the wavelength of fluorescence and which are disposed around the optical filter to detect both stimulated fluorescence and prompt fluorescence. Using this radiation detecting portion, one can perform complete remote sensing. In addition, the cross-sectional size of the radiation detecting portion can be reduced to less than 1 cm in diameter, which is small enough to permit easy radiation measurement even if the installation area is small or the detecting portion is quite long.

Figure 23:
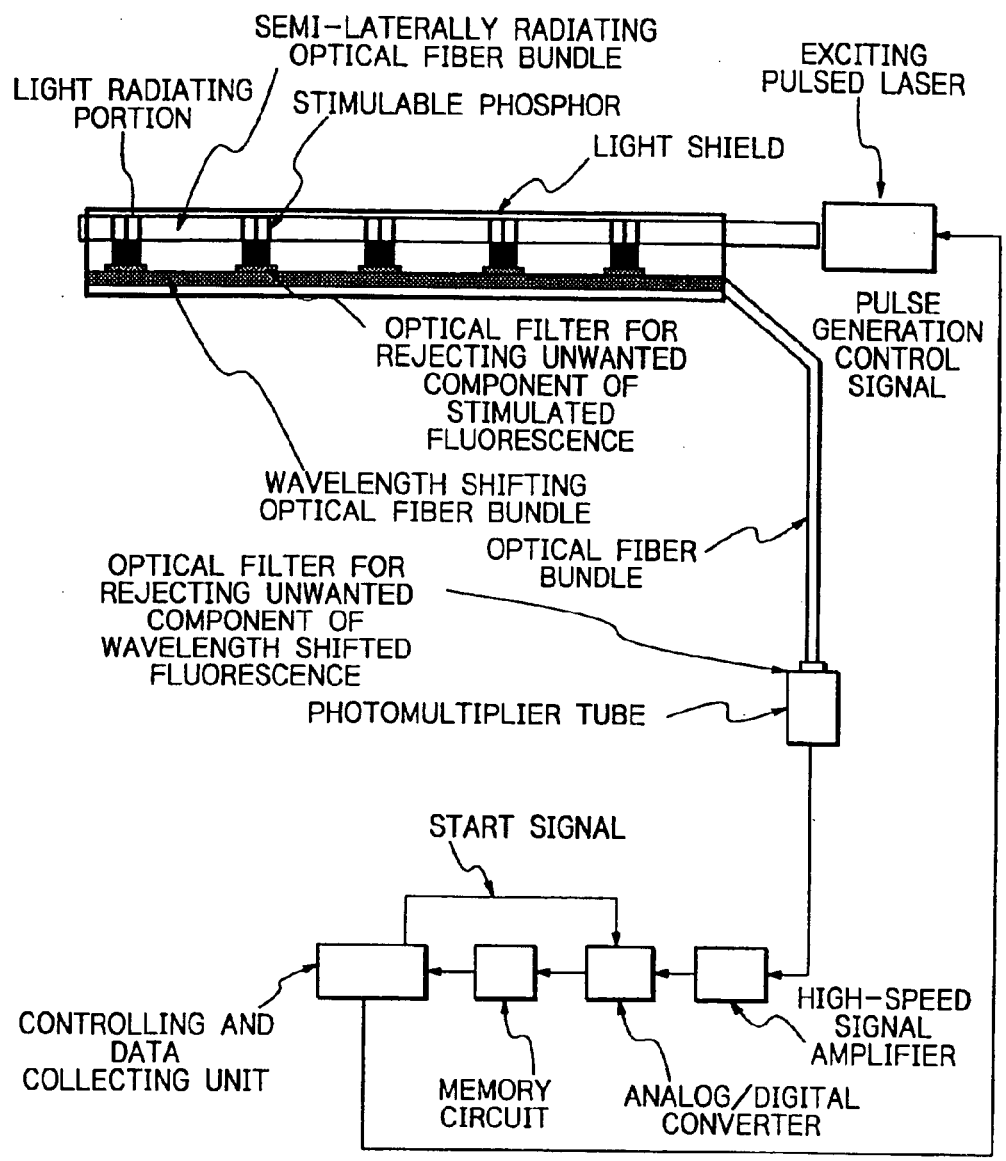
FIG. 23 shows still another embodiment of the apparatus for radiation measurement of the invention which enables measurement of a positional distribution of radiation using a multiple of series connected radiation detecting portions including a stimulable phosphor.

We now describe example 18 with reference to FIG. 23. In this example, a stimulable phosphor spanning a long distance is used as a radiation detecting medium and in order to ensure that the dose of radiation accumulated in the stimulable phosphor can be read together with the associated position information, a special mechanism is used to illuminate the stimulable phosphor with exciting light of a very short pulse duration.

In order to enhance the position resolution for each site of radiation measurement in the example under consideration, the stimulable phosphor to be used must have a short enough fluorescence lifetime. This need can be met by Y$_2$SiO$_5$:Ce which emits stimulated fluorescence having a very short lifetime of 30 ns. The excitation wavelength of this stimulable phosphor is centered at 620 nm. Upon illumination with exciting light, this phosphor emits stimulated fluorescence at 410 nm. Since these characteristics are generally the same as those of BaFBr:Eu$^{2+}$ which are used in the foregoing examples, the exciting light source and the wavelength shifting optical fiber or fibers that are to be used in the example under consideration are also the same as what are used in the foregoing examples. A radiation detecting portion using the stimulable phosphor is provided at each site of measurement and the stimulable phosphor is illuminated with exciting light having a pulse duration no longer than 2 ns. The exciting light source is typically a semiconductor laser. The radiator of exciting light in the illumination mechanism is an optical fiber that has at least two areas spaced along its length where light can be radiated from the entire circumference or a part of its circumference. In registry with each site of light irradiation, the stimulable phosphor as a radiation detecting medium, an optical bandpass filter centered at the wavelength of fluorescence, and one or more wavelength shifting fibers that are sensitive to the wavelengths of stimulated fluorescence and prompt fluorescence and which are used to detect both types of fluorescence are superposed one on another to construct the radiation detecting portion. The time of incidence of pulsed exciting light output from the laterally radiating optical fiber is related to the temporal distribution of the stimulated fluorescence output from the wavelength shifting fibers and this relationship is used to determine the distribution of the dose of incident radiation at the specified sites of radiation measurement.

Figure 24:
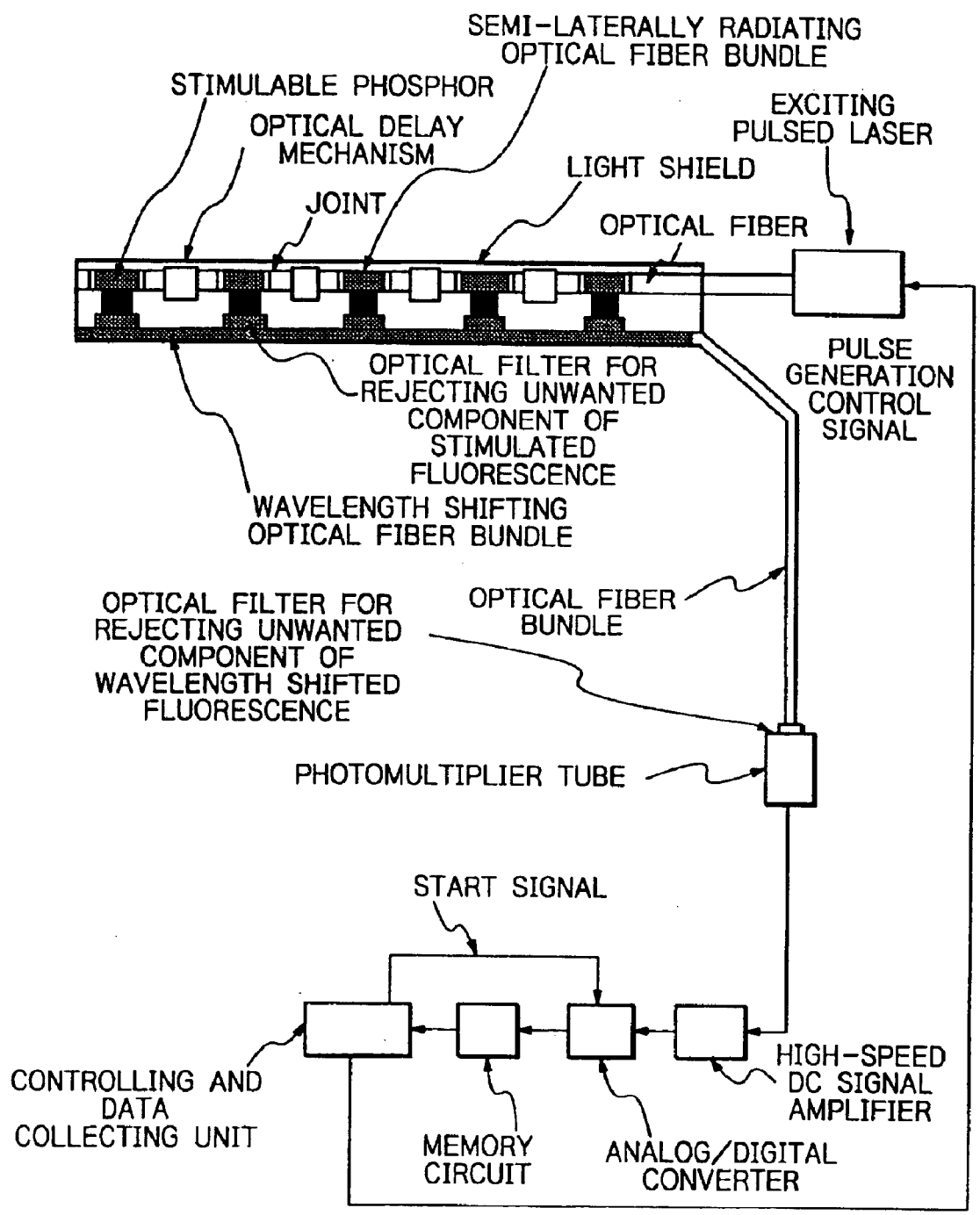
FIG. 24 shows another embodiment of the apparatus for radiation measurement of invention which enables measurement of a positional distribution of radiation using a multiple of radiation detecting portions including a stimulable phosphor that are series connected with optical delay mechanisms.

We now describe example 19 with reference to FIG. 24. The radiation detecting portion of this example can be made of essentially the same components as in example 18. The radiator of exciting light in the mechanism for illuminating a stimulable phosphor (radiation detecting medium) with exciting light to read the dose of radiation accumulated in the stimulable phosphor is at least one illuminating optical fiber which consists of a laterally or semi-laterally radiating optical fiber, an optical delay mechanism and an ordinary optical fiber that are connected alternately. The back side of the laterally or semi-laterally radiating optical fiber length is overlaid with the stimulable phosphor as the radiation detecting medium and an optical filter centered at the wavelength of fluorescence which, in turn, is overlaid on the back side with at least one wavelength shifting optical fiber sensitive to stimulated fluorescence. The optical delay mechanism used in the example under consideration is an optical fiber having a length corresponding to a delay time of 30 ns. By increasing the interval between emissions of exciting light from successive laterally or semi-laterally radiating optical fiber lengths, the arrival time of exciting light is sufficiently delayed to ensure that the dose of radiation is correctly determined in each position of measurement.

Figure 25:
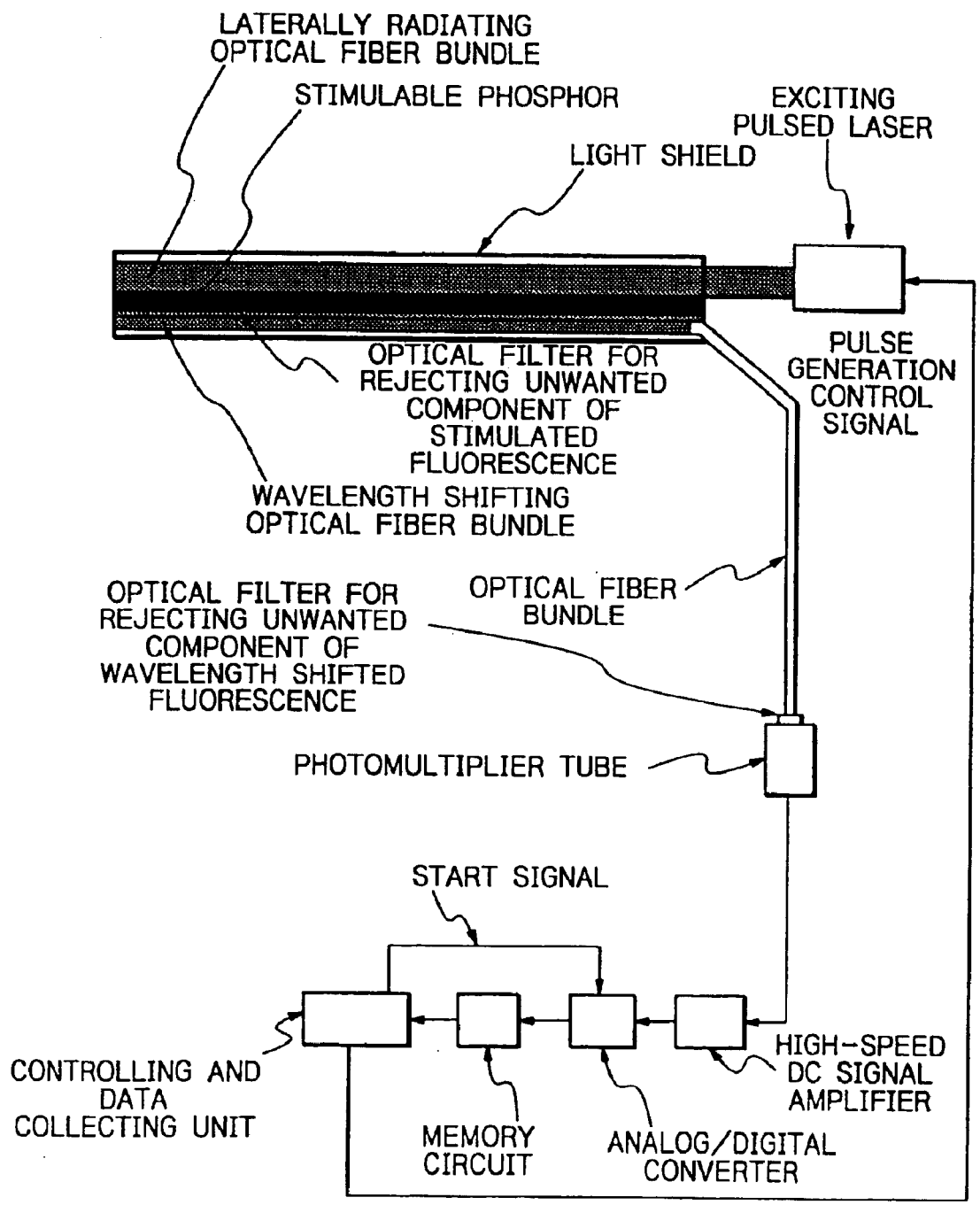
FIG. 25 shows yet another embodiment of the apparatus for radiation measurement of the invention which enables measurement of a positional distribution of radiation with pulsed exciting light using a radiation detecting portion in the form of a planar array.
Figure 26:
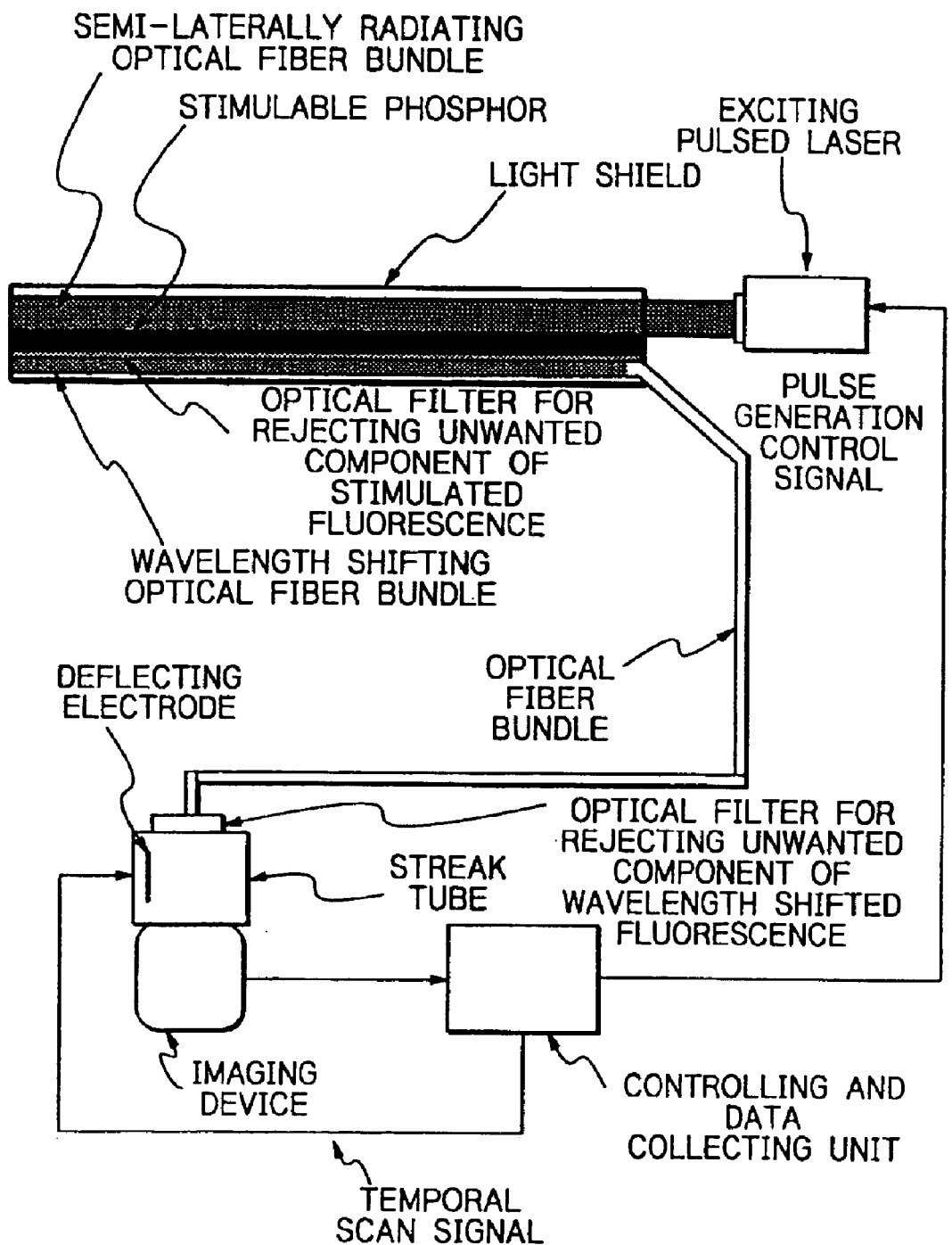
FIG. 26 shows still another embodiment of the apparatus for radiation measurement of the invention which enables measurement of a positional distribution of radiation with pulsed exciting light using a radiation detecting portion in the form of a planar array and a streak camera.

We now describe example 20 with reference to FIG. 25. The radiation detecting portion used in this example is the same as what is used in example 14. In order to enhance the position resolution for each site of radiation measurement, the stimulable phosphor to be used in the example under consideration must also have a short enough fluorescence lifetime. This need can be met by Y$_2$SIO$_5$:Ce which emits stimulated fluorescence having a very short lifetime of 30 ns. The excitation wavelength of this stimulable phosphor is centered at 620 nm. Upon illumination with exciting light, this phosphor emits stimulated fluorescence at 410 nm. Since these characteristics are generally the same as those of BaFBr:Eu$^{2+}$ which are used in the foregoing examples, the exciting light source and the wavelength shifting optical fiber or fibers that are to be used in the example under consideration are also the same as what are used in the foregoing examples. The radiation detecting portion using the stimulable phosphor is provided at each site of measurement and the stimulable phosphor is illuminated with exciting light having a pulse duration no longer than 2 ns via at least one laterally radiating optical fiber. The exciting light source is typically a semiconductor laser. The stimulated fluorescence emitted from the stimulable phosphor is detected with the wavelength shifting fiber radiator. As in example 18, the time of incidence of pulsed exciting light output from the laterally or semi-laterally radiating optical fiber is related to the temporal distribution of the intensity of the stimulated fluorescence output from the wavelength shifting fibers and this relationship is used to determine the continuous distribution of the dose of incident radiation at the specified sites of radiation measurement. To achieve this, the temporal distribution of the fluorescence output from the wavelength shifting fiber is measured with a signal processing circuitry which consists of a photomultiplier tube, a high-speed DC signal amplifier, an analog/digital converter, a memory circuit and a controlling/data collecting unit as shown in FIG. 25. The analog/digital converter should have a sampling rate of at least 100 MHz. The positional resolution that can be realized is determined by the lifetime of the fluorescence from the stimulable phosphor which is 30 ns in the example under consideration and the best value is about 10 m.

We now describe example 21 with reference to FIG. 2E. This example is the same as example 20 (see FIG. 25) except that the signal processing circuitry for measuring the fluorescence output from the wavelength shifting fiber is replaced by a streak camera based technology. To be more specific, the fluorescence output from the wavelength shifting fiber is launched into a streak camera and the temporal distribution of the intensity of stimulated fluorescence is measured at high speed with varying time scan signals being supplied to the deflecting electrodes synchronously with the launching of pulsed exciting light into the semi-laterally radiating optical fiber. The measured temporal distribution is recorded in an imaging device such as a CCD camera. An example of the streak camera that can be used in the example under consideration is C2830 of Hamamatsu Photonics which is capable of high-speed scanning. The recorded data is captured by the data collecting/controlling unit and the distribution of incident radiation doses at the sites of measurement can be determined on the basis of the temporal distribution of the captured fluorescence intensity data. Again, the positional resolution that can be realized is determined by the lifetime of the fluorescence from the stimulable phosphor which is 30 ns in the example under consideration and the best value is about 10 m.

We now describe the invention of example 22. The apparatus described in connection with examples 18–21 can complete the intended measurement within a very short period of time. In example 22, the procedure of such measurement is repeated more than once in order to read the signal for the radiation accumulated within the stimulable phosphor in the radiation detecting portion. If the radiation detecting portion is 100 m long, the reading process ends within 1 $\mu$s. This means that even if the stimulable phosphor is illuminated with 1,000 applications of pulsed exciting light for reading the dose of accumulated radiation, the desired data can be collected within 1 ms. The number of times the pulsed exciting light is applied to the stimulable phosphor can be determined in accordance with the optical power of the laser light. The distribution of incident radiation doses at the sites of measurement can be precisely determined on the basis of the temporal distribution of the integral of fluorescence intensity.

Figure 27:
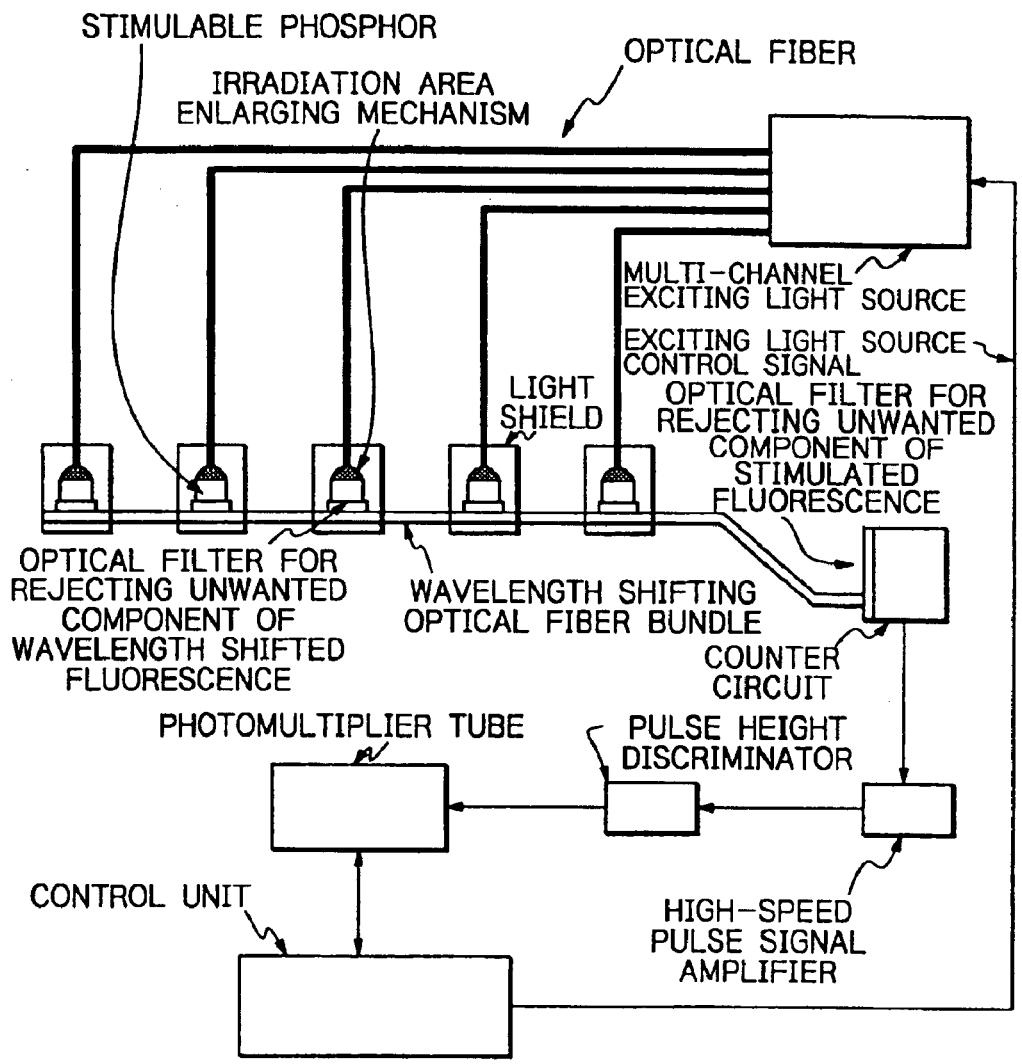
FIG. 27 shows still another embodiment of the apparatus for radiation measurement of the invention which enables measurement of a positional distribution of radiation with a single bundle of wavelength shifting optical fibers that read the stimulated fluorescence emitted from a multiple of stimulable phosphors provided at predetermined sites of radiation measurement.

We now describe example 23 with reference to FIG. 27. The purpose of this example is to measure radiation with the stimulable phosphor as a radiation detecting medium being provided at two or more sites. The radiation detecting portion comprises in superposition a plurality of stimulable phosphors, an optical fiber for illuminating each stimulable phosphor with exciting light, an optical bandpass filter centered at the wavelengths of prompt fluorescence and the stimulated fluorescence that is emitted from the stimulable phosphors upon illumination with exciting light, and at least one wavelength shifting fiber sensitive to the wavelength of fluorescence that is used to detect the emissions of the stimulated fluorescence and prompt fluorescence. To excite the respective stimulable phosphors, laser light is emitted from a multi-channel exciting light source and launched into the optical fibers. The sites of measurement can be selectively set by a control unit and stimulated fluorescence is read with a single wavelength shifting fiber. Signal processing is synchronous with the signal for controlling the exciting light source and performed by a conventional apparatus comprising a photomultiplier tube, a high-speed pulsed signal amplifier, a pulse height discriminator, a counter circuit and a control unit.

Figure 28A:
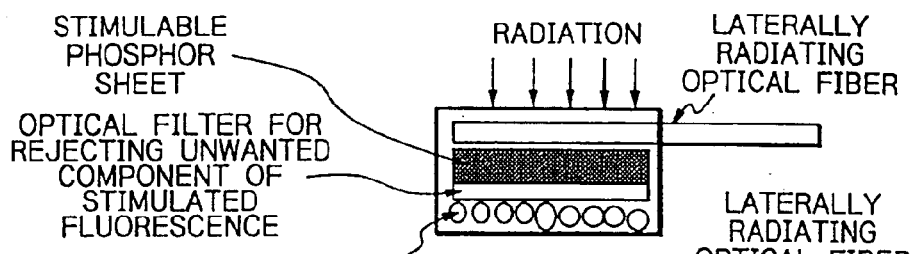
FIG. 28 shows yet another embodiment of the apparatus for radiation measurement of the invention which produces a two-dimensional radiation image using laterally radiating optical fibers to launch exciting light.
Figure 28B:
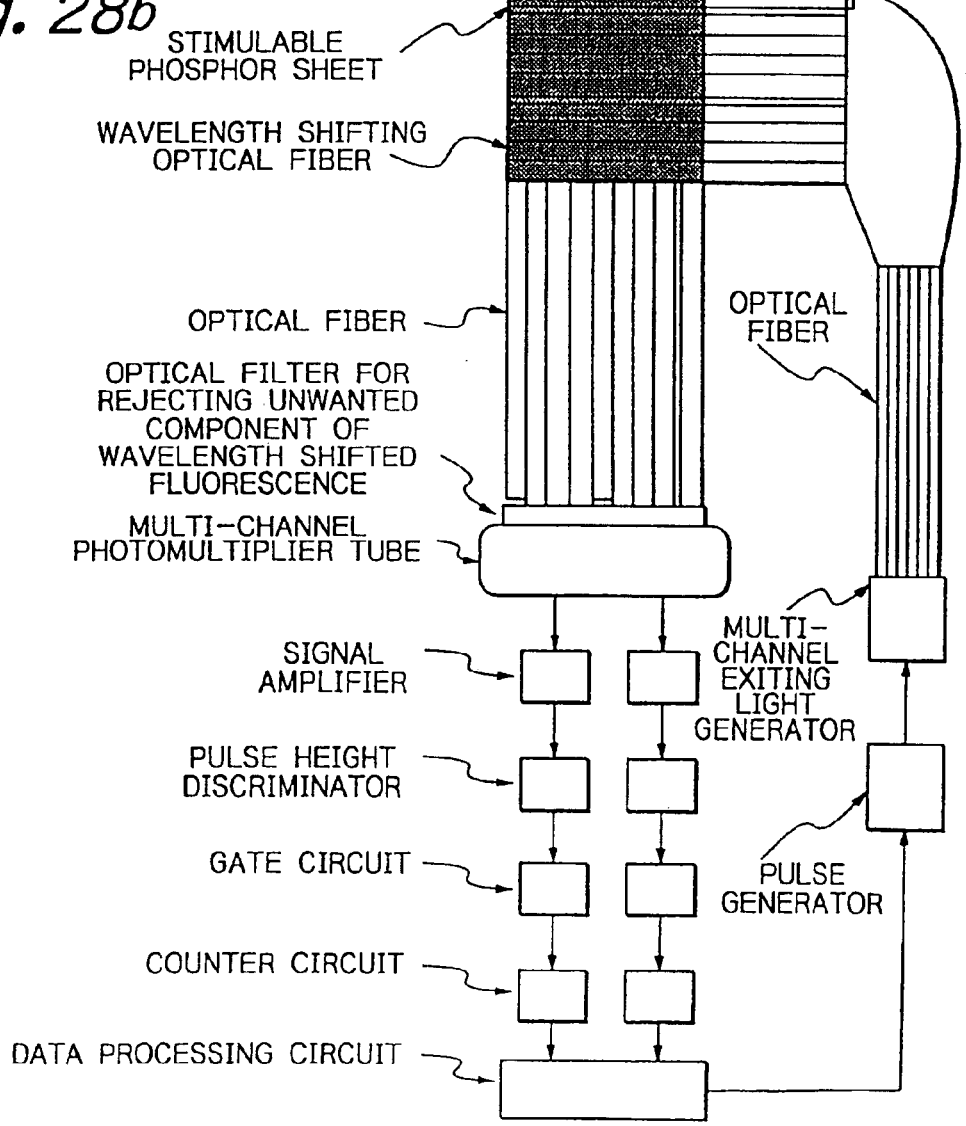

We now describe example 24 with reference to FIG. 28. A conventional apparatus for reading radiation image from a stimulable phosphor sheet (commercially available as an imaging plate) comprises a stimulable phosphor sheet, an exciting light source emitting light of a wavelength that can excite the stimulable phosphor, a mechanism for illuminating the stimulable phosphor sheet with a rectangular pattern of the output exciting light, an optical bandpass filter centered at the wavelength of stimulated fluorescence, a wavelength shifter bundle comprising a ribbon array of wavelength shifting optical fibers that can be excited with the stimulated fluorescence, an optical bandpass filter centered at the wavelength of the shifted fluorescence, a photodetector capable of multi-channel detection of the fluorescence emitted from the respective wavelength shifting optical fibers, and a signal processing unit that processes the signals from the multi-channel detector to produce digital signals for constructing a radiation image. Example 24 illustrates an improvement of this conventional apparatus. In order to illuminate the stimulable phosphor sheet with a rectangular pattern of the exciting light from the light source, laterally radiating optical fibers are arranged on the surface of the stimulable phosphor sheet in a direction perpendicular to the bundle of wavelength shifting optical fibers and the exciting light is launched from the light source into the laterally radiating optical fibers in turn. As a result, the mechanism for illuminating the exciting light is simplified and the dose of radiation accumulated in the stimulable phosphor sheet can be easily read together with the associated position information.

Figure 29:
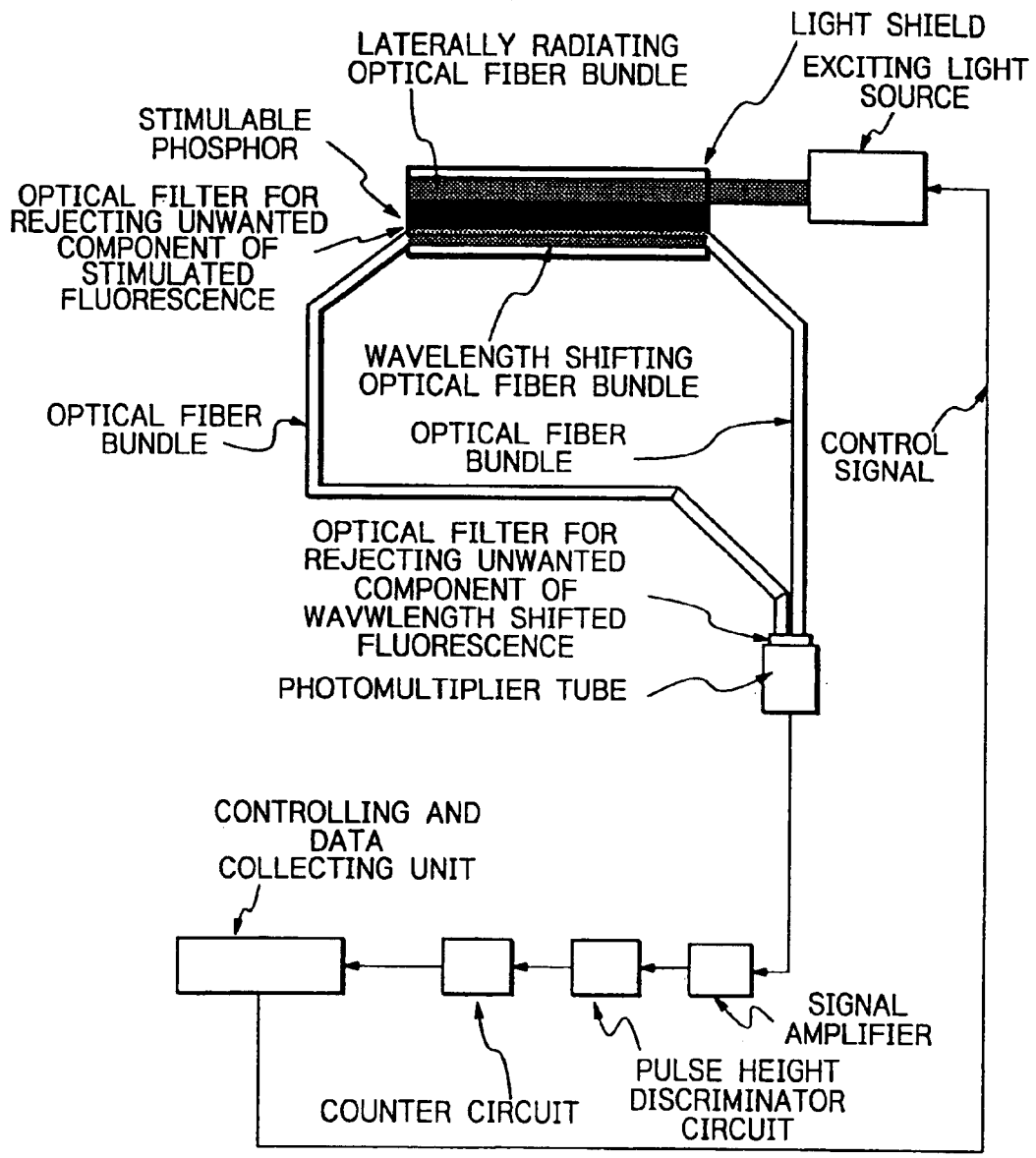
FIG. 29 shows another embodiment of the apparatus for radiation measurement of the invention which uses the same photodetector to measure the fluorescence output from both ends of a wavelength shifting optical fiber bundle in a radiation detecting portion in the form of a planar array.

We now describe example 25 with reference to FIG. 29. In this example, the fluorescence output from both ends of the wavelength shifting fiber in the radiation detecting portion described in examples 13–17 is passed through an optical bandpass filter centered at the wavelength of fluorescence and then detected with a photomultiplier tube used as the photodetector in the fluorescence detecting mechanism described in example 10. By detecting the fluorescence output at both ends of the wavelength shifting fiber in the radiation detecting portion, the efficiency of detection is almost doubled.

Figure 30:
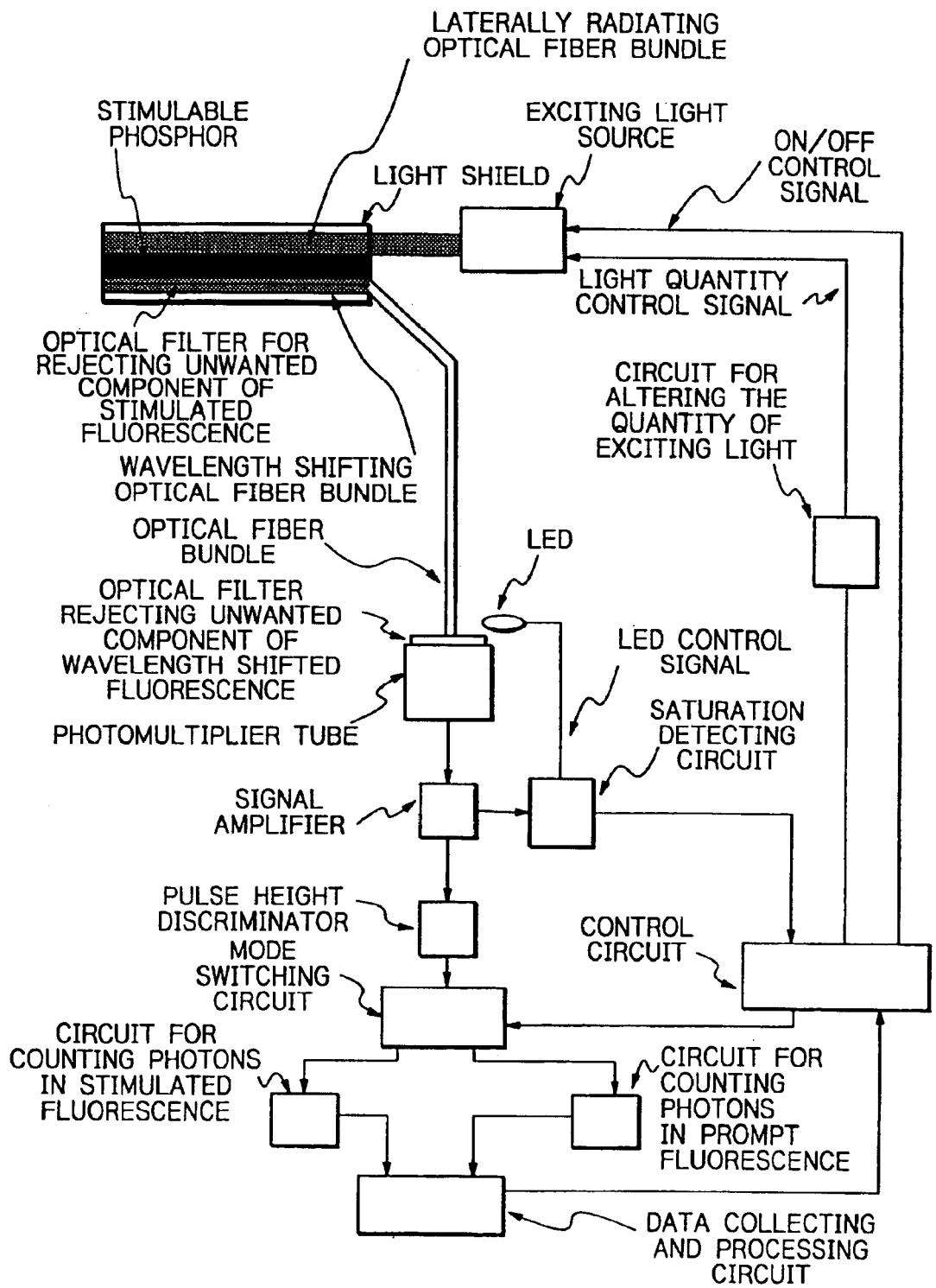
FIG. 30 shows another embodiment of the differential and integral-type apparatus for radiation measurement of the invention which uses a radiation detecting portion in the form of a planar array.

We now describe example 26 with reference to FIG. 30. This example is the combination of examples 1 and 10 in that the method of radiation measurement recited in example 1 is applied to the apparatus for radiation measurement recited in example 10. A small radiation detecting portion that is capable of measurement over a long distance is operated by a method of measuring the incident radiation dose through selective detection of stimulated fluorescence and prompt fluorescence at specified time intervals and by a method capable of reading the dose of intense radiation incident within a very short time and, as a result, a high performance apparatus for radiation measurement is realized.

Figure 31:
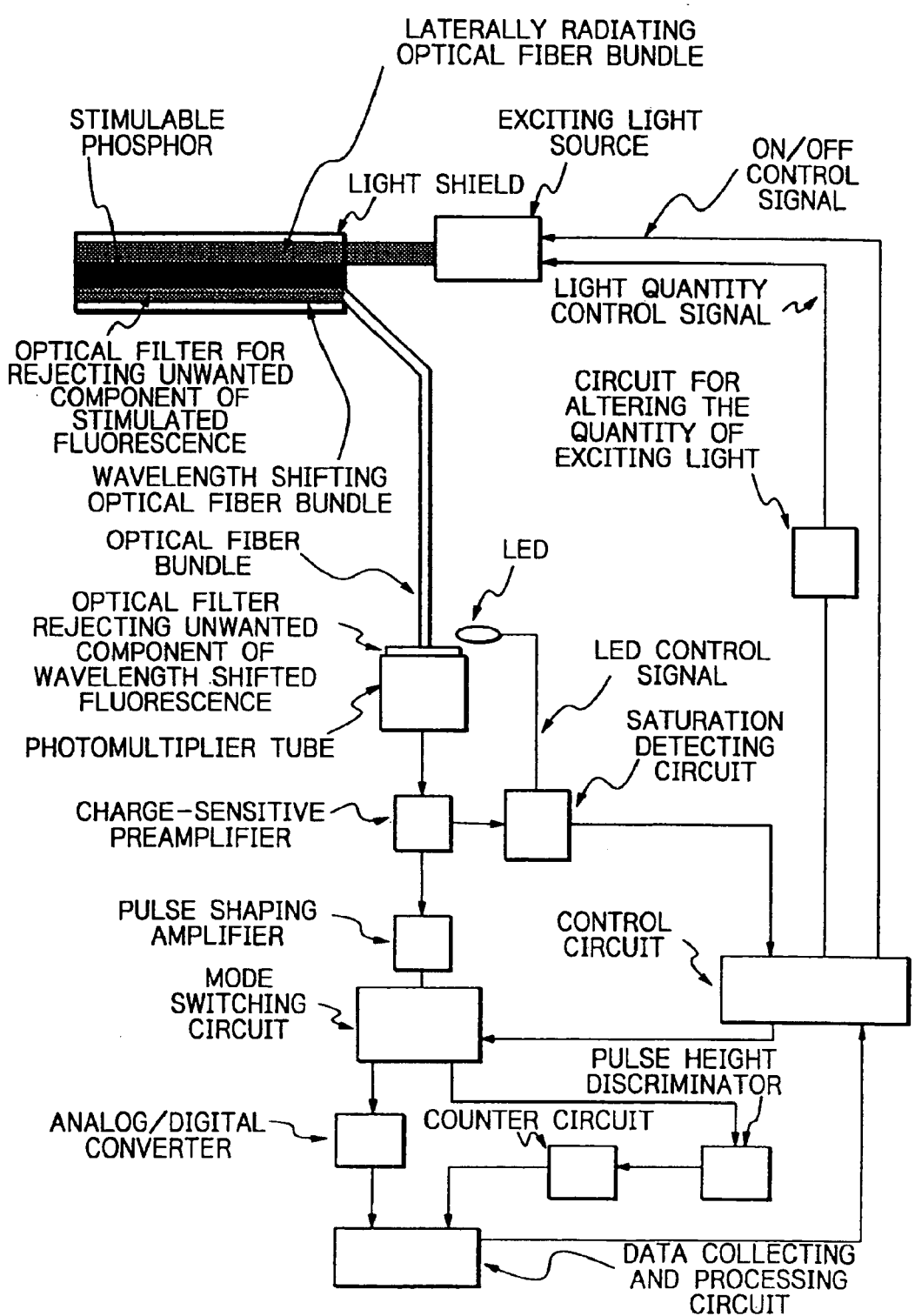
FIG. 31 shows a differential and integral-type apparatus for implementing yet another embodiment the method of radiation measurement of the invention which applies a pulsed optically stimulated fluorescence reading technique to a radiation detecting portion in the form of a planar array.

We now describe example 27 with reference to FIG. 31. In this example, the signal reading method recited in example 3 is substituted for the conventional pulse counting method in order to read the signal for stimulated fluorescence in the apparatus recited in example 26. The radiation detecting portion used in the example is a planar array comprising in superposition a bundle of laterally radiating optical fibers, a stimulable phosphor as a radiation detecting medium, an optical filter centered at the wavelength of fluorescence, and a bundle of wavelength shifting optical fibers sensitive to stimulated fluorescence. This radiation detecting portion is used to construct a differential and integral type of radiation measuring apparatus that selectively detects stimulated fluorescence and prompt fluorescence at specified time intervals on the basis of two actions of the stimulable phosphor, one for emitting stimulated fluorescence in proportion to the dose of incident radiation upon illumination with exciting light and the other for emitting prompt fluorescence in response to the incident radiation. The fluorescence detecting mechanism is monitored at specified time intervals with a saturation detecting circuit to see if it has failed by saturation with high-intensity radiation; if saturation occurs, stimulated fluorescence is detected after the detecting mechanism has recovered from saturation, thereby reading the dose of high-intensity radiation that was incident within a short time.

In this process, the quantity of exciting light to be applied to the stimulable phosphor is altered such that the dose of radiation can be measured without saturation of the fluorescence detecting mechanism. To read the dose of radiation, the stimulable phosphor is illuminated with pulsed exciting light having a short time duration and the emission of stimulated fluorescence is detected with a photodetector, amplified by a charge-sensitive preamplifier, has the waveform shaped by a pulse shaping amplifier and fed into an analog/digital converter to determine the pulse height, on the basis of which a data collecting and processing circuit determines the dose of radiation accumulated in the stimulable phosphor.

Figure 32:
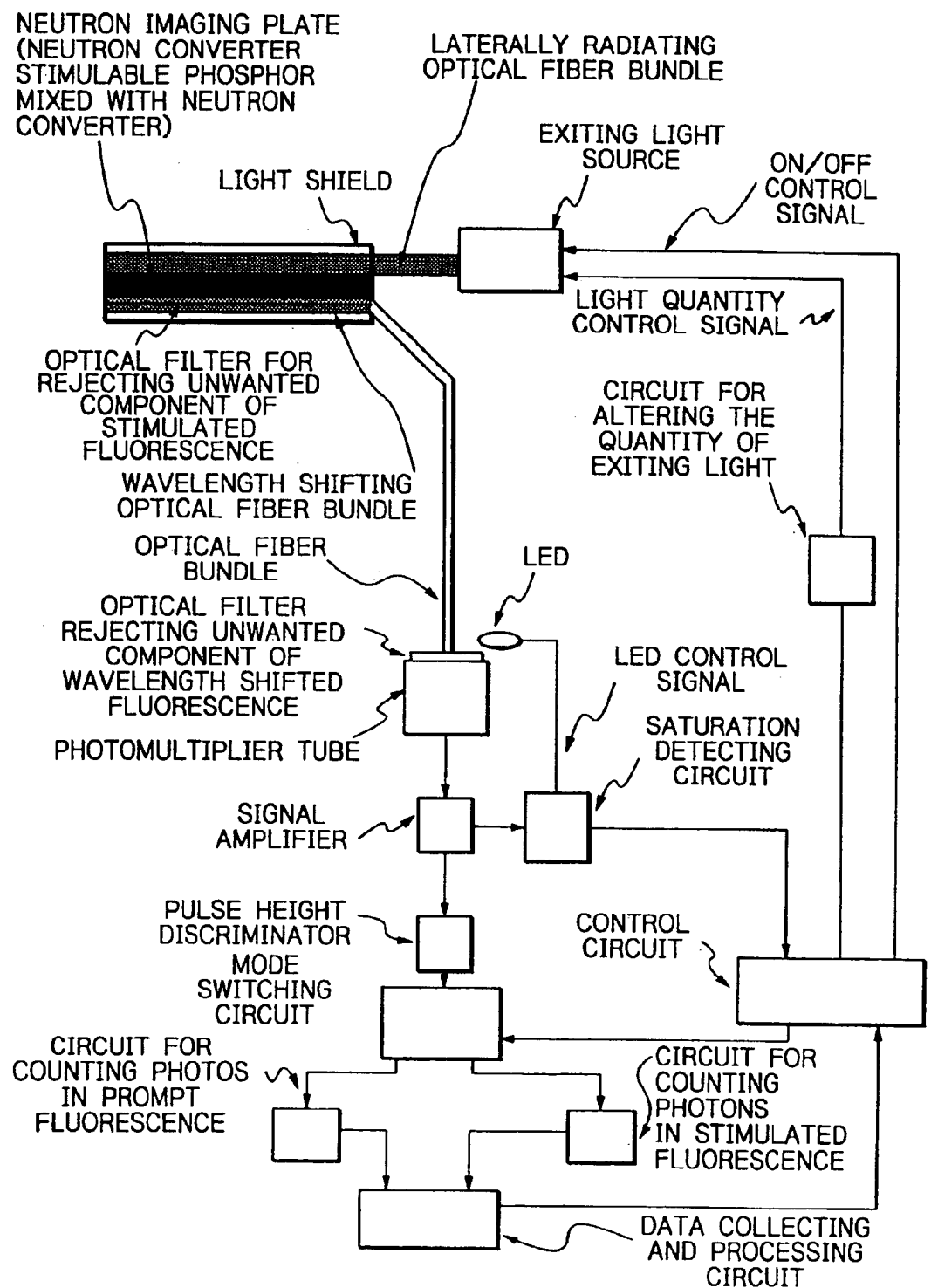
FIG. 32 shows another embodiment of the differential and integral-type apparatus for radiation measurement of the invention which is capable of neutron measurement using both a neutron converter and a stimulable phosphor as a radiation detecting medium.

We now describe example 28 with reference to FIG. 32. In this example, the stimulable phosphor used as a radiation detecting medium in the apparatus of example 22 is replaced by a neutron imaging plate incorporating Gd which is a neutron converter capable of converting neutrons to an ionizable radiation (this plate is commercially available from Fuji Photo Film Co., Ltd. as one of BAS-ND Series neutron imaging plates). By using a radiation detecting medium which is a mixture of the neutron converter and the stimulable phosphor, one can construct a radiation measuring apparatus that performs the functions described in the previous examples and which has the added capability of measuring neutrons.

Figure 33:
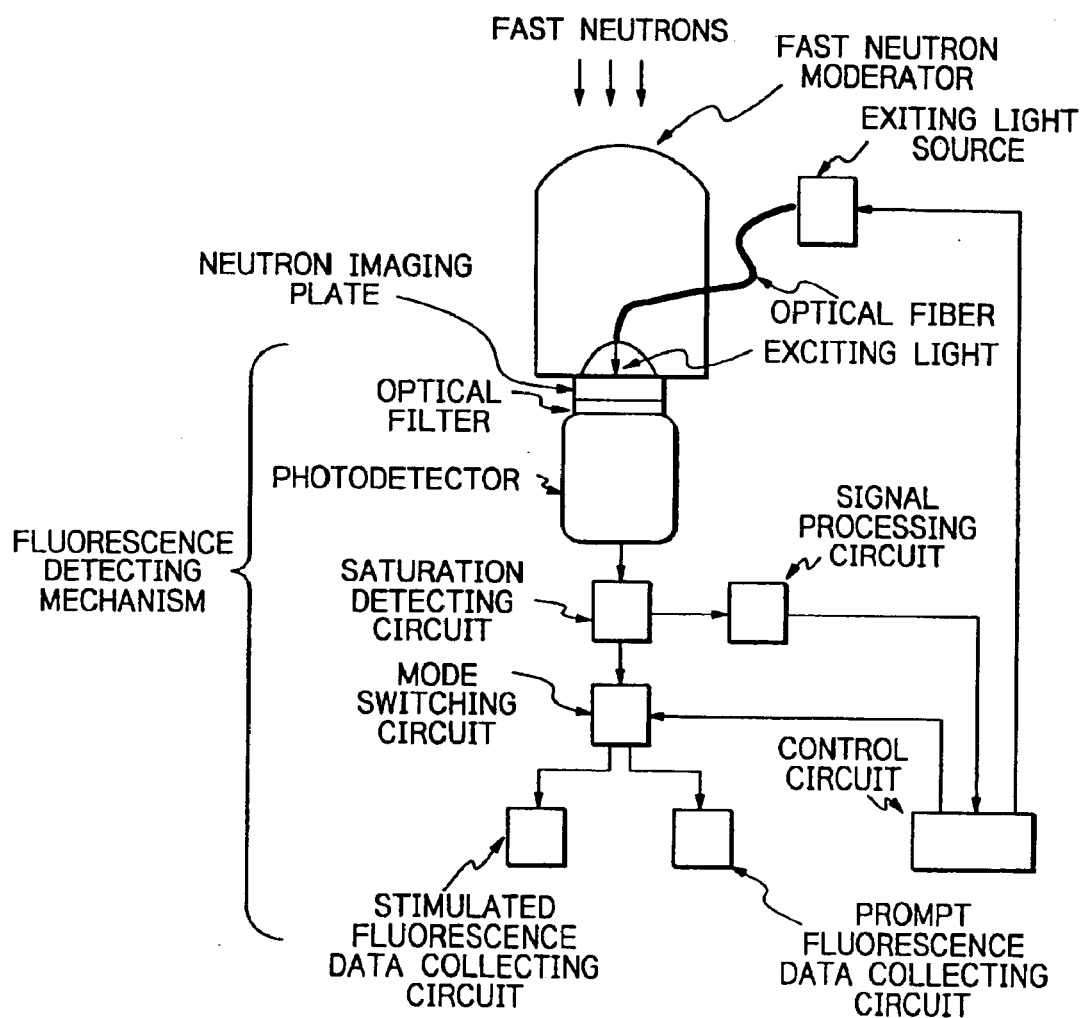
FIG. 33 shows an apparatus for implementing another embodiment of the method of radiation measurement of the invention which is capable of neutron measurement using a fast neutron moderator.

We now describe example 29 with reference to FIG. 33. In this example, a neutron imaging plate is used as the detection medium in the method of radiation measurement recited in example 2 and a fast neutron moderator in the form of a warhead is provided in front of the imaging plate to allow for detection of fast neutrons. Exciting light is guided by an optical fiber and emitted from within a space created by boring the center of the fast neutron moderator which is typically made of polyethylene.

Figure 34:
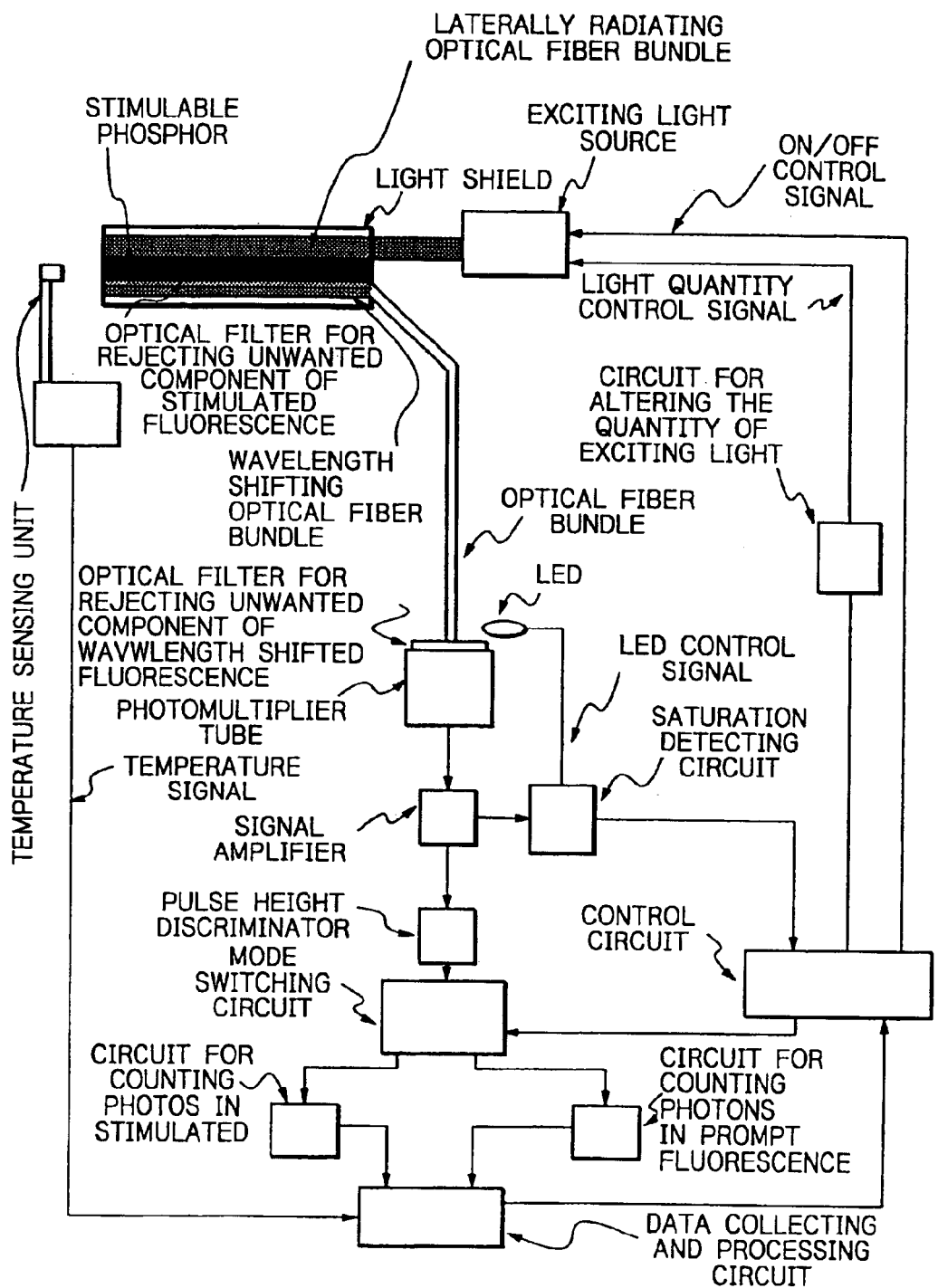
FIG. 34 shows another embodiment of the differential and integral-type apparatus for radiation measurement of the invention, which is characterized by correcting the accumulated dose of radiation in a stimulable phosphor on the basis of its temperature as measured with a temperature sensor.
Figure 35:
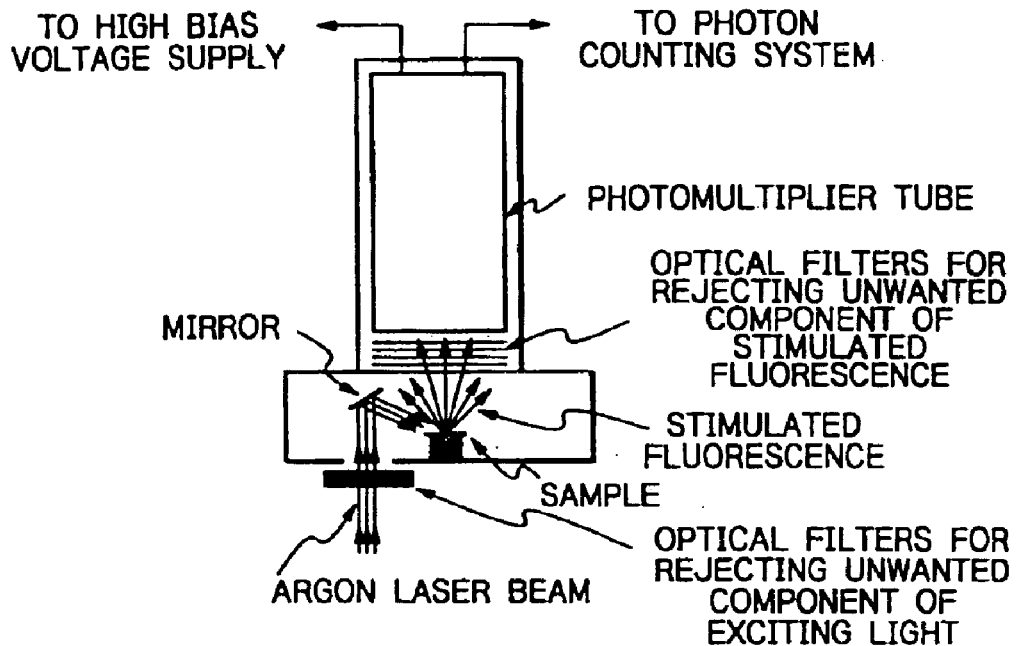
FIG. 35 is a schematic of an apparatus for implementing a conventional method of reading stimulated fluorescence.
Figure 36:
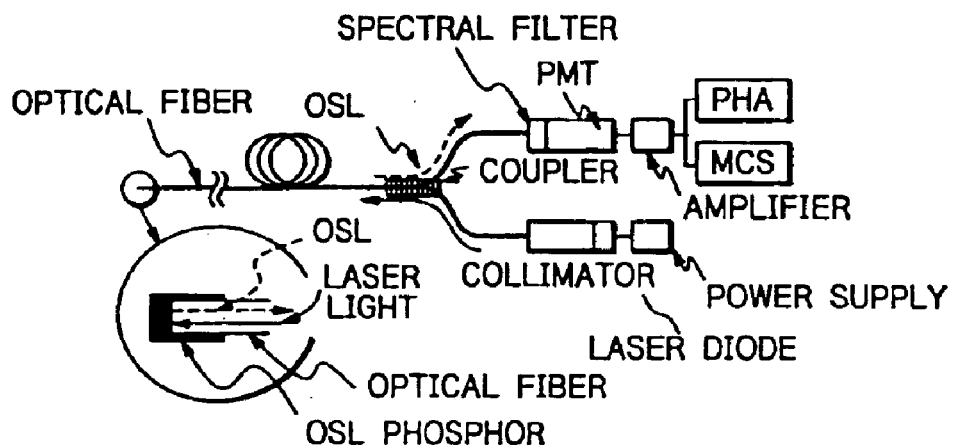
FIG. 36 is a schematic of an apparatus for implementing another conventional method of radiation measurement using a radiation detecting portion having a small amount of stimulable phosphor attached to the end of an optical fiber.
Figure 37:
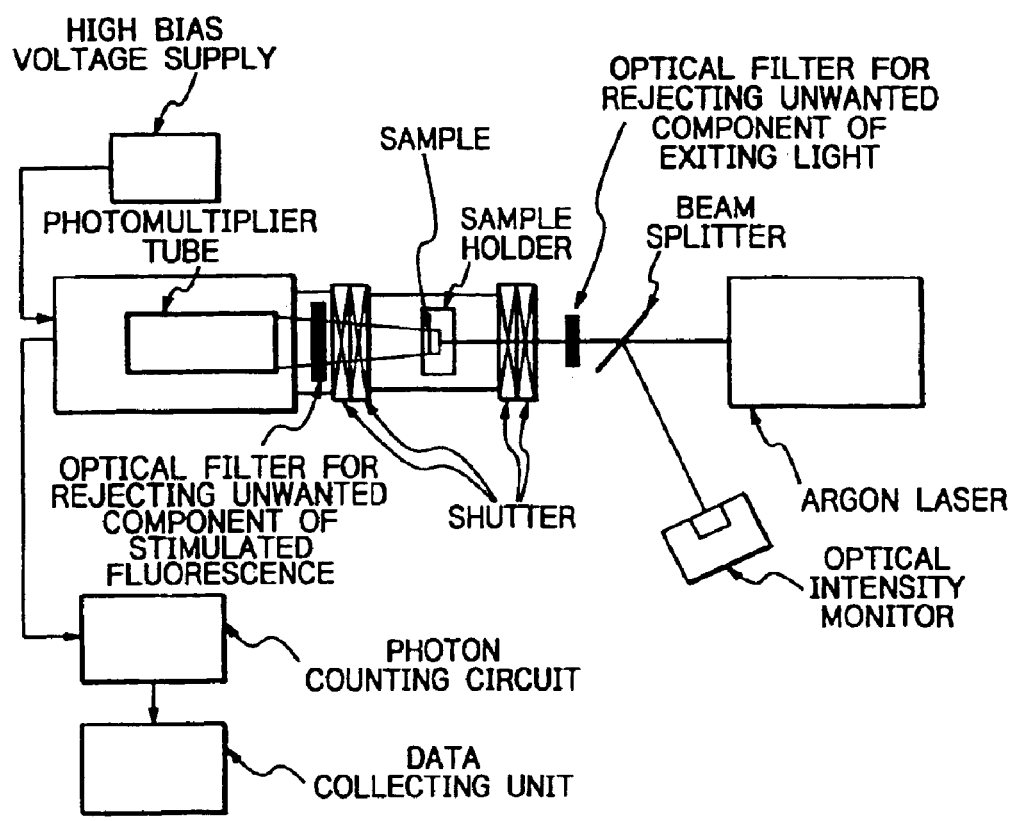
FIG. 37 is a schematic of an apparatus for implementing yet another conventional method of reading the accumulated dose of radiation in a stimulable phosphor using a pulsed exciting light source.
Figure 38:
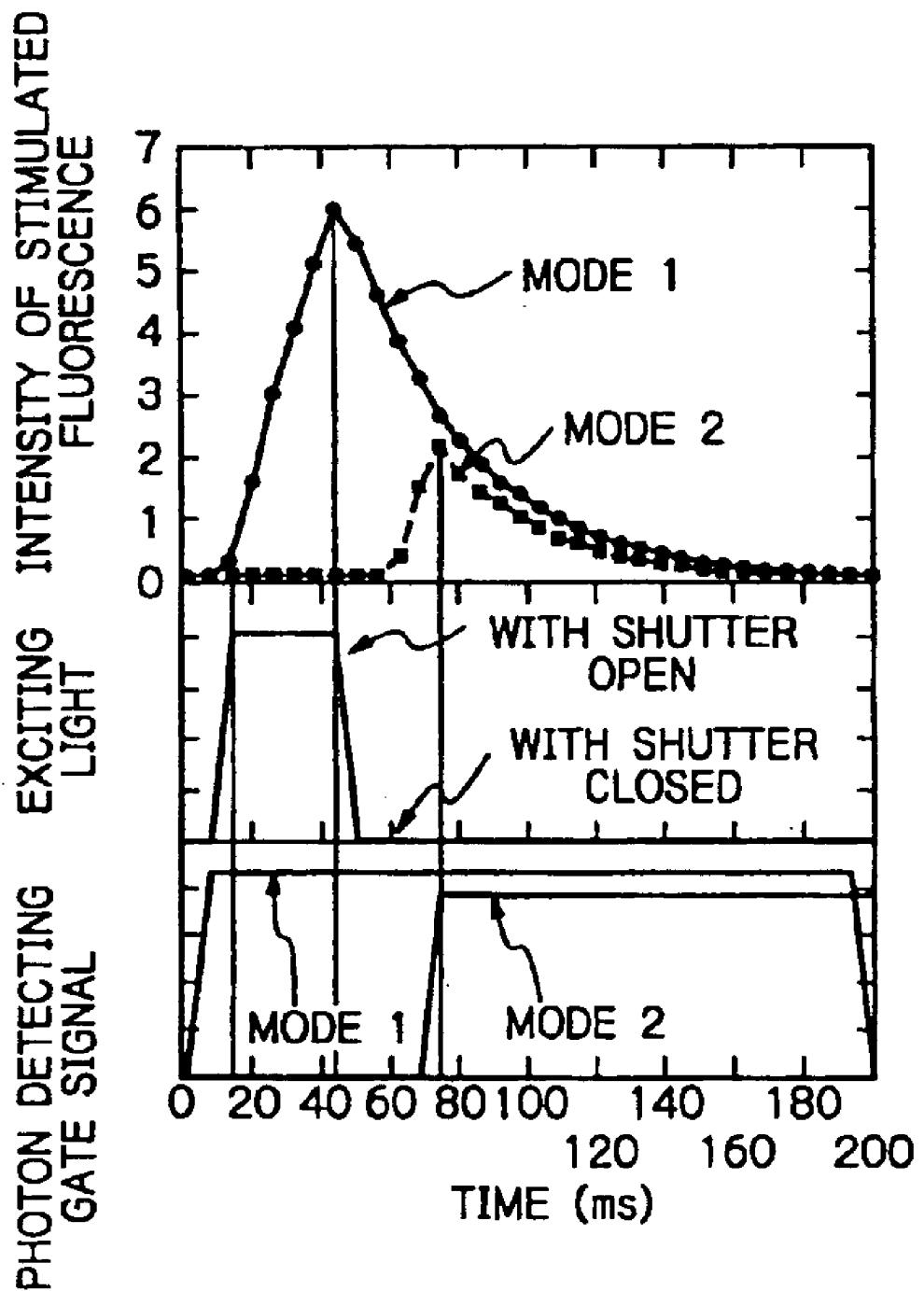
FIG. 38 is a diagram showing the timing of reading stimulated fluorescence by illumination with pulsed exciting light in a conventional method, as well as the emission characteristics of stimulated fluorescence obtained by a conventional fast photon counting method.
Figure 39:
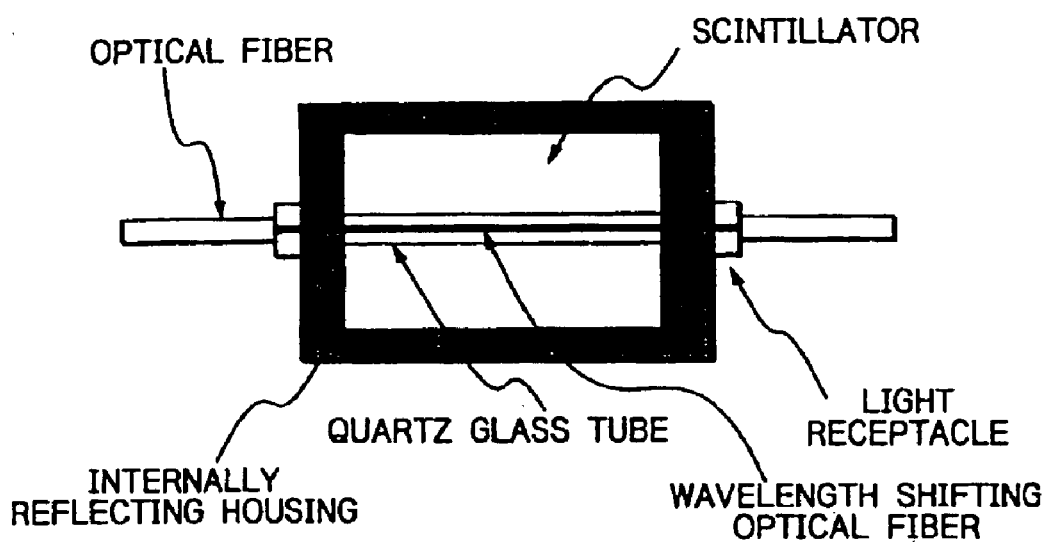
FIG. 39 is a schematic of an apparatus for implementing a conventional method of measuring the dose of radiation and the position of measurement simultaneously using a scintillator and an optical fiber.
Figure 40:
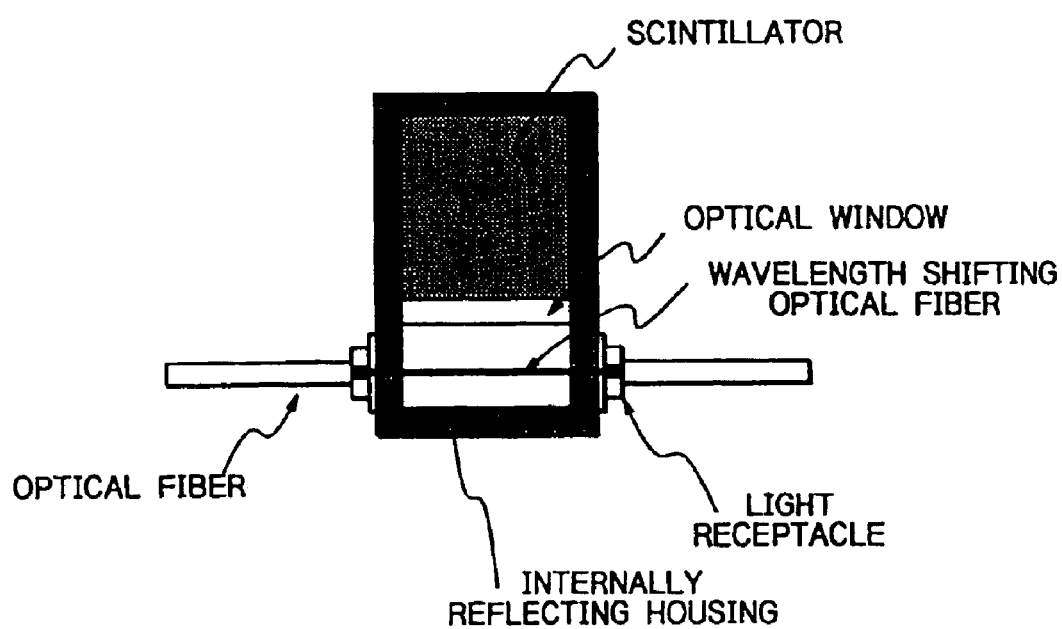
FIG. 40 is a schematic of a conventional radiation detecting portion capable of simultaneous measurement of the dose of radiation and the position of measurement using a scintillator and a wavelength shifting optical fiber.

We now describe example 30 with reference to FIG. 34. The emission characteristics of stimulated fluorescence from the stimulable phosphor as a radiation detecting medium and the phenomenon of fading (i.e., the radiation signal gradually disappears with time) both depend on temperature. To modify the radiation measuring apparatus according to the example 26 on the basis of this finding, the temperature of the stimulable phosphor is measured with a temperature sensor and a temperature detecting circuit in example 30. On the basis of the measured temperature, the dose of accumulated radiation that is measured by illumination with exciting light is corrected by the data collecting and processing circuit to ensure precise measurement of radiation dose in spite of variations in the temperature of the radiation detecting portion.

EFFECT OF THE INVENTION

Being constructed with these designs, the present invention offers the following advantages.

The dose of incident radiation is determined real-time from the results of measurement of stimulated fluorescence and prompt fluorescence at specified time intervals and this not only allows a wide dynamic range of radiations from a very weak level to a very intense level to be covered with a single detector but also enables correct dosimetry of high-intensity radiations and neutrons that occur instantaneously.

The stimulable phosphor is illuminated with exciting light of short time duration and by taking advantage of the short lifetime of stimulated fluorescence, signal processing can be performed with a conventional radiation detecting system.

By using a laterally radiating optical fiber, the stimulable phosphor can be illuminated with exiting light by a simple and remote operation; there is no need to install a light source such as a laser in high-dose areas and one can construct a small mechanism for illuminating exciting light.

By a parallel arrangement of wavelength shifting fibers sensitive to the wavelengths of stimulated fluorescence and prompt fluorescence, a sufficient detection area is assured to enable the detection of stimulated fluorescence; in addition, there is no need to install a photodetector such as a photomultiplier tube in high-dose areas.

If desired, a ribbon array of wavelength shifting optical fibers may be used in combination with a parallel arrangement of laterally radiating optical fibers. By sandwiching the laterally radiating optical fibers between assemblies each consisting of a stimulable phosphor, an optical filter and the ribbon array of wavelength shifting optical fibers, small-sized radiation detecting portions can be constructed in various shapes for detection.

If desired, the detecting portion of the sandwich structure may be extended over a distance and exciting light having a very short pulse duration is launched into the laterally radiating optical fibers so that the incident exciting light propagates to illuminate the stimulable phosphor and the emission of stimulated fluorescence is detected with the bundle of wavelength shifting optical fibers. In this way, the positional distribution of radiation doses can be measured over a long distance.

The stimulable phosphor may incorporate, mix or combine with a neutron converter such as Gd that converts neutrons into an ionizable radiation. By using the thus prepared neutron detector, one can construct a radiation measuring apparatus capable of neutron detection.

By using the above-described apparatus and method for radiation measurement, a wide dynamic range of radiation doses from a very weak level to a very intense level can be covered with a single detector and dosimetry of high-intensity radiations and neutrons that occur instantaneously can be achieved; as a result, the doses of high-intensity radiations and neutrons that occur instantaneously around an accelerator or a target or those which result from an unexpected accident in nuclear reactor facilities can be measured conveniently, with high sensitivity and in high precision.

What is claimed is:

1. A method for measuring the dose of radiation accumulated in a stimulable phosphor BaFBr:Eu$^{2+}$ as a radiation detecting medium having a fluorescence lifetime of no longer than 2 μs, comprising the steps of illuminating the stimulable phosphor with pulsed exciting light having an irradiation time not longer than the lifetime of stimulated fluorescence from the stimulable phosphor, detecting the emitted fluorescence with a photodetector, amplifying the detected signal with a charge-sensitive preamplifier, feeding the amplified output signal into a pulse shaping amplifier where it is subjected to both waveform shaping with a time constant longer than the lifetime of stimulated fluorescence from the stimulable phosphor and amplification, and feeding the shaped and amplified signal into an analog/digital converter to determine the pulse height, wherein a gated photomultiplier tube is used as the photodetector and synchronously with the illumination of the stimulable phosphor with pulsed exciting light having an irradiation time not longer than the lifetime of stimulated fluorescence from the stimulable phosphor, the gate of the photomultiplier tube is controlled such that it remains off as long as the illumination continues but turns on after the illumination ends, and the emission of stimulated fluorescence from the excited stimulable phosphor is detected.

2. A method for measuring the dose of radiation accumulated in a stimulable phosphor of BaFBr:Eu$^{2+}$ as a radiation detecting medium having a fluorescence lifetime of no longer than 2 μs in case that a moderate intensity of radiation has been accumulated in the stimulable phosphor, wherein the timing of the emission of stimulated fluorescence is random and a single pulse of it may or may not be emitted synchronously with the pulsed exciting light, comprising the steps of illuminating the stimulable phosphor with pulsed exciting light having an irradiation time not longer than twice the lifetime of stimulated fluorescence from the stimulable phosphor, detecting the emitted fluorescence with a photodetector, amplifying the detected signal with a signal amplifier, feeding the amplified output signal into a pulse height discriminator, picking up the signal for stimulated fluorescence as a pulse signal, performing coincident counting on the pulse signal and a read signal constructed using a signal indicating the time duration of illumination with the pulsed exciting light, whereby the stimulated fluorescence signal is picked up on the basis of it being output in accordance with the lifetime of fluorescence upon illumination with the pulsed exciting light, and counting the number of stimulated fluorescence signals with a counter circuit.

* * * * *